United States Patent
Su et al.

(10) Patent No.: US 10,440,454 B2
(45) Date of Patent: Oct. 8, 2019

(54) SIGNAL PROCESSING METHOD, APPARATUS, AND SYSTEM

(71) Applicant: Huawei Technologies Co., Ltd., Shenzhen, Guangdong (CN)

(72) Inventors: Wei Su, Amsterdam (NL); Maarten P. J. Vissers, Amsterdam (NL); Qiuyou Wu, Shezhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/438,122

(22) Filed: Feb. 21, 2017

(65) Prior Publication Data

US 2017/0230736 A1  Aug. 10, 2017

Related U.S. Application Data

(63) Continuation of application No. PCT/CN2015/082225, filed on Jun. 24, 2015.

(30) Foreign Application Priority Data

Aug. 22, 2014 (CN) .......................... 2014 1 0418517

(51) Int. Cl.
*H04Q 11/00* (2006.01)
*H04J 3/16* (2006.01)
*H04B 10/27* (2013.01)

(52) U.S. Cl.
CPC ......... *H04Q 11/0003* (2013.01); *H04B 10/27* (2013.01); *H04J 3/1652* (2013.01);
(Continued)

(58) Field of Classification Search
CPC . H04Q 11/0003; H04Q 11/0062; H04B 10/27
(Continued)

(56) References Cited

U.S. PATENT DOCUMENTS

| 8,494,363 B2 * | 7/2013 | Calderon | H04J 3/1664 370/503 |
|---|---|---|---|
| 8,989,222 B1 * | 3/2015 | Mok | H04J 14/0201 370/474 |

(Continued)

FOREIGN PATENT DOCUMENTS

| CN | 100373847 C | 3/2008 |
|---|---|---|
| CN | 101834688 A | 9/2010 |

(Continued)

OTHER PUBLICATIONS

ITUT G709/Y.1331 (Feb. 2012).*

*Primary Examiner* — Oommen Jacob
(74) *Attorney, Agent, or Firm* — Kilpatrick Townsend & Stockton, LLP

(57) ABSTRACT

Embodiments of the present invention provide a signal processing method, a network apparatus, and a system. The method includes: mapping a received first client signal into a first ODUflex; mapping the first ODUflex into an optical channel data tributary unit (ODTUCn.X) including X tributary slots, where X is a non-integer; and multiplexing the ODTUCn.X into an optical channel payload unit (OPUCn). According to the signal processing method provided in the embodiments of the present invention, carrying efficiency can be improved when a fine-grained service is transmitted, and complexity is relatively low.

21 Claims, 22 Drawing Sheets

(52) U.S. Cl.
CPC ......... *H04Q 11/00* (2013.01); *H04Q 11/0062* (2013.01); *H04Q 2011/0088* (2013.01)

(58) Field of Classification Search
USPC .......................................................... 398/45
See application file for complete search history.

(56) References Cited

U.S. PATENT DOCUMENTS

| | | | | |
|---|---|---|---|---|
| 9,264,283 | B2* | 2/2016 | Tochio | H04J 3/1652 |
| 9,847,859 | B2* | 12/2017 | Fu | H04J 14/0227 |
| 2007/0071443 | A1* | 3/2007 | Fukumitsu | H04J 3/07 |
| | | | | 398/79 |
| 2007/0248121 | A1 | 10/2007 | Zou | |
| 2010/0142947 | A1* | 6/2010 | Shin | H04J 3/1652 |
| | | | | 398/43 |
| 2010/0183301 | A1* | 7/2010 | Shin | H04J 3/1658 |
| | | | | 398/45 |
| 2010/0226652 | A1* | 9/2010 | Vissers | H04J 3/1652 |
| | | | | 398/98 |
| 2011/0318001 | A1* | 12/2011 | Li | H04J 3/1652 |
| | | | | 398/43 |
| 2012/0002671 | A1* | 1/2012 | Xiao | H04J 3/1652 |
| | | | | 370/389 |
| 2012/0251127 | A1* | 10/2012 | Ohkubo | H04J 3/1652 |
| | | | | 398/182 |
| 2013/0004169 | A1 | 1/2013 | Mohamad et al. | |
| 2013/0071117 | A1* | 3/2013 | Pan | H04J 3/12 |
| | | | | 398/45 |
| 2013/0084062 | A1* | 4/2013 | Hu | H04L 49/10 |
| | | | | 398/2 |
| 2013/0209087 | A1* | 8/2013 | Yuan | H04J 3/1652 |
| | | | | 398/9 |
| 2013/0259484 | A1* | 10/2013 | Kawahara | H04J 14/08 |
| | | | | 398/98 |
| 2013/0315592 | A1* | 11/2013 | Sharma | H04B 10/27 |
| | | | | 398/58 |
| 2015/0139650 | A1* | 5/2015 | Su | H04B 10/27 |
| | | | | 398/66 |
| 2015/0256258 | A1* | 9/2015 | Fu | H04B 10/27 |
| | | | | 398/58 |
| 2015/0381280 | A1* | 12/2015 | Shirai | H04J 14/00 |
| | | | | 398/79 |
| 2016/0087739 | A1* | 3/2016 | Kametani | H04J 3/0691 |
| | | | | 398/56 |
| 2016/0197691 | A1 | 7/2016 | Su et al. | |
| 2016/0204895 | A1 | 7/2016 | Vissers et al. | |
| 2017/0230736 | A1* | 8/2017 | Su | H04J 3/1652 |
| 2017/0366255 | A1* | 12/2017 | Sharma | H04B 10/032 |

FOREIGN PATENT DOCUMENTS

| | | |
|---|---|---|
| CN | 102316391 A | 1/2012 |
| CN | 102893629 A | 1/2013 |
| CN | 103533464 A | 1/2014 |
| EP | 1826926 A1 | 8/2007 |

* cited by examiner

| OMFI bits 5678 | Multi-frame row | Frame row | ... | 14n | 14n+1 | 14n+2 | ... | 15n | 15n+1 | 15n+2 | ... | 16n |
|---|---|---|---|---|---|---|---|---|---|---|---|---|
| 0000 | 1 | 1 | | | TSOH TS1.1 | TSOH TS2.1 | ... | TSOH TSn.1 | TSOH TS1.1 | TSOH TS2.1 | ... | TSOH TSn.1 |
| | 2 | 2 | | | | | | | | | | |
| | 3 | 3 | | | | | | | | | | |
| | 4 | 4 | | | PSI | PSI | ... | PSI | OMFI | RES | ... | RES |
| 0001 | 5 | 1 | | | TSOH TS1.2 | TSOH TS2.2 | ... | TSOH TSn.2 | TSOH TS1.2 | TSOH TS2.2 | ... | TSOH TSn.2 |
| | 6 | 2 | | | | | | | | | | |
| | 7 | 3 | | | | | | | | | | |
| | 8 | 4 | | | PSI | PSI | ... | PSI | OMFI | RES | ... | RES |
| 0010 | 9 | 1 | | | TSOH TS1.3 | TSOH TS2.3 | ... | TSOH TSn.3 | TSOH TS1.3 | TSOH TS2.3 | ... | TSOH TSn.3 |
| | 10 | 2 | | | | | | | | | | |
| | 11 | 3 | | | | | | | | | | |
| | 12 | 4 | | | PSI | PSI | ... | PSI | OMFI | RES | ... | RES |
| 0011 | 13 | 1 | | | TSOH TS1.4 | TSOH TS2.4 | ... | TSOH TSn.4 | TSOH TS1.4 | TSOH TS2.4 | ... | TSOH TSn.4 |
| | 14 | 2 | | | | | | | | | | |
| | 15 | 3 | | | | | | | | | | |
| | 16 | 4 | | | PSI | PSI | ... | PSI | OMFI | RES | ... | RES |
| 0100 | 17 | 1 | | | TSOH TS1.5 | TSOH TS2.5 | ... | TSOH TSn.5 | TSOH TS1.5 | TSOH TS2.5 | ... | TSOH TSn.5 |
| | 18 | 2 | | | | | | | | | | |
| | 19 | 3 | | | | | | | | | | |
| | 20 | 4 | | | PSI | PSI | ... | PSI | OMFI | RES | ... | RES |

CONT. FROM FIG. 2A

| | | | | TSOH TS1.6 | TSOH TS2.6 | ... | TSOH TSn.6 | TSOH TS1.6 | TSOH TS2.6 | ... | TSOH TSn.6 |
|---|---|---|---|---|---|---|---|---|---|---|---|
| 0101 | 21 | 1 | | | | | | | | | |
| | 22 | 2 | | | | | | | | | |
| | 23 | 3 | | | | | | | | | |
| | 24 | 4 | | PSI | PSI | ... | PSI | OMFI | RES | ... | RES |
| 0110 | 25 | 1 | | TSOH TS1.7 | TSOH TS2.7 | ... | TSOH TSn.7 | TSOH TS1.7 | TSOH TS2.7 | ... | TSOH TSn.7 |
| | 26 | 2 | | | | | | | | | |
| | 27 | 3 | | | | | | | | | |
| | 28 | 4 | | PSI | PSI | ... | PSI | OMFI | RES | ... | RES |
| 0111 | 29 | 1 | | TSOH TS1.8 | TSOH TS2.8 | ... | TSOH TSn.8 | TSOH TS1.8 | TSOH TS2.8 | ... | TSOH TSn.8 |
| | 30 | 2 | | | | | | | | | |
| | 31 | 3 | | | | | | | | | |
| | 32 | 4 | | PSI | PSI | ... | PSI | OMFI | RES | ... | RES |
| 1000 | 33 | 1 | | TSOH TS1.9 | TSOH TS2.9 | ... | TSOH TSn.9 | TSOH TS1.9 | TSOH TS2.9 | ... | TSOH TSn.9 |
| | 34 | 2 | | | | | | | | | |
| | 35 | 3 | | | | | | | | | |
| | 36 | 4 | | PSI | PSI | ... | PSI | OMFI | RES | ... | RES |
| 1001 | 37 | 1 | | TSOH TS1.10 | TSOH TS2.10 | ... | TSOH TSn.10 | TSOH TS1.10 | TSOH TS2.10 | ... | TSOH TSn.10 |
| | 38 | 2 | | | | | | | | | |
| | 39 | 3 | | | | | | | | | |
| | 40 | 4 | | PSI | PSI | ... | PSI | OMFI | RES | ... | RES |

FIG. 2B

CONT. FROM FIG. 2A

TO FIG. 2D

| | 16n+1 | 16n+2 | ... | 17n | 17n+1 | 17n+2 | ... | 18n | 18n+1 | ... | 26n | ... |
|---|---|---|---|---|---|---|---|---|---|---|---|---|
| 1 1 | 2 1 | ... | n 1 | 1 2 | 2 2 | ... | n 2 | 1 3 | ... | n 10 | ... |

FIG. 2C

| | 3806n+1 | 3806n+2 | ... | 3807n | 3807n+1 | 3807n+2 | ... | 3808n | 3808n+1 | ... | 3816n | 3816n+1 | ... | 3824n |
|---|---|---|---|---|---|---|---|---|---|---|---|---|---|---|
| CONT. FROM FIG. 2C | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| T A B | 1 1 | 2 1 | ... | n 1 | 1 2 | 2 2 | ... | n 2 | 1 3 | ... | n 10 | FS | | |

FIG. 2D

|  | 1 | 2 | 3 | 4 | 5 | 6 | 7 | 8 | 10G TS |
|---|---|---|---|---|---|---|---|---|---|
| PSI[2.y]<br>PSI[3.y] | TS occupied | Tributary port # | | | | | | | TS #A.1 |
| PSI[4.y]<br>PSI[5.y] | TS occupied | Tributary port # | | | | | | | TS #A.2 |
| PSI[6.y]<br>PSI[7.y] | TS occupied | Tributary port # | | | | | | | TS #A.3 |
| ⋮ | | | | ⋮ | | | | | ⋮ |
| PSI[20.y]<br>PSI[21.y] | TS occupied | Tributary port # | | | | | | | TS #A.10 |

Notes: $A = y = 1...n$

FIG. 5

|  | 1 | 2 | 3 | 4 | 5 | 6 | 7 | 8 | 10G TS |
|---|---|---|---|---|---|---|---|---|---|
| PSI[x.y]<br>PSI[x+1.y] | Occupied | MSB | ... Tributary port # ... | | | | | LSB | TS # A.B |

0: not occupied
1: occupied 000 0000 0000 0000: tributary port #1
000 0000 0000 0000: tributary port #2
000 0000 0000 0000: tributary port #3
000 0000 0000 0000: tributary port #4
⋮
000 0000 0000 0000: tributary port #10n Notes: $A = y = 1...n$, $B = x/2 = 1...10$

FIG. 6

|  | 1 | 2 | 3 | 4 | 5 | 6 | 7 | 8 | 5G TS |
|---|---|---|---|---|---|---|---|---|---|
| PSI [x,y] | Occupied | Tributary port # ... | | | | | | | TS #A.B.1 |
| PSI [x+1,y] | Occupied | Tributary port # ... | | | | | | | TS #A.B.2 |
|  | MSB | | | | | | | LSB | |

0: not occupied
1: occupied 000 0000: tributary port #1
000 0000: tributary port #2
000 0000: tributary port #3
⋮
111 1111: tributary port #127

Notes: $A = y = 1...n, B = x/2 = 1...10$

FIG. 14

|  | 1 | 2 | 3 | 4 | 5 | 6 | 7 | 8 | 10G TS |
|---|---|---|---|---|---|---|---|---|---|
| PSI [x,y] | 10G TS occupied | MSB | Tributary port number ... | | | | | | TS #A.B |
| PSI [x+1,y] | | | | | | | | LSB | |

|  | 1 | 2 | 3 | 4 | 5 | 6 | 7 | 8 | 5G TS |
|---|---|---|---|---|---|---|---|---|---|
| PSI [x,y] | 0 | 5G TS occupied | Tributary port number ... | | | | | | TS #A.B.1 |
| PSI [x+1,y] | Reserved | 5G TS occupied | Tributary port number ... | | | | | | TS #A.B.2 |
|  |  |  | MSB |  |  |  |  | LSB |  |

Notes: $A = y = 1...n, B = x/2 = 1...10$

FIG. 15

US 10,440,454 B2

SIGNAL PROCESSING METHOD, APPARATUS, AND SYSTEM

CROSS-REFERENCE TO RELATED APPLICATIONS

This application is a continuation of International Application No. PCT/CN2015/082225, filed on Jun. 24, 2015, which claims priority to Chinese Patent Application No. 201410418517.2, filed on Aug. 22, 2014. The disclosures of the aforementioned applications are hereby incorporated by reference in their entireties.

TECHNICAL FIELD

The present invention relates to the field of optical communications technologies, and specifically, to a signal processing method, an apparatus, and a system.

BACKGROUND

As a core technology of a next-generation transport network, an optical transport network (OTN) includes technical specifications of an electronic layer and an optical layer, has rich operation, administration and maintenance (OAM) functions, a powerful tandem connection monitoring (TCM) function, and an out-of-band forward error correction (Forward Error Correction, FEC) function, and can implement flexible grooming and management on large-capacity services.

As a rate of a client signal is increasing, a frame in an OTN technology for transmitting the client signal is continuously evolving. Currently, the International Telecommunication Union is discussing a new transmission frame exceeding 100 Gbit/s. However, when such a superspeed transmission frame is used to transmit a service of a relatively low rate, multilevel multiplexing needs to be performed by using an existing low-rate transmission frame, resulting in relatively high complexity and a relatively long delay. On the other hand, if a client signal is carried by directly using a high-rate transmission frame without multilevel multiplexing, there is a problem of low bandwidth utilization.

SUMMARY

In view of this, embodiments of the present invention provide a signal processing method, an apparatus, and a system.

According to a first aspect, an embodiment of the present invention provides a signal processing method, including: mapping a received first client signal into a first ODUflex; mapping the first ODUflex into an optical channel data tributary unit Cn ODTUCn.X including X tributary slots, where X is a non-integer; and multiplexing the ODTUCn.X into an optical channel payload unit Cn OPUCn.

With reference to the first aspect, in a first possible implementation manner, the ODTUCn.X includes one or more ODTUCn.$1.2^x$s, where each ODTUCn.$1.2^x$ occupies $1/2^x$ of a tributary slot in the OPUCn, and x is equal to 1, 2, 3, 4, or 5.

With reference to the first aspect and the first possible implementation manner of the first aspect, in a second possible implementation manner, an overhead of the OPUCn includes a payload structure identifier PSI, the PSI includes a payload type PT identifier and a multiplex structure identifier MSI, the PT identifier is used to indicate that the OPUCn carries a client signal that occupies a non-integral quantity of tributary slots, and the MSI is used to indicate tributary slots occupied by the one or more ODTUCn.$1.2^x$s.

With reference to all the foregoing implementation manners, in a third possible implementation manner, the method further includes: mapping a received second client signal into a second ODUflex; mapping the second ODUflex into an optical channel data tributary unit Cn ODTUCn.Z including Z tributary slots, where Z is an integer; and multiplexing the ODTUCn.Z into the OPUCn.

With reference to all the foregoing implementation manners, in a fourth possible implementation manner, at least one ODTUCn.$1.2^x$ that carries the first client signal and at least one ODTUCn.$1.2^y$ that carries another client signal share one tributary slot in the OPUCn, where each ODTUCn.$1.2^y$ occupies $1/2^y$ of a tributary slot in the OPUCn, and y is equal to 1, 2, 3, 4, or 5; and optionally, one ODTUCn.$1.2^x$ and one ODTUCn.$1.2^y$ share one tributary slot in the OPUCn, where both x and y are equal to 1; and the shared tributary slot in the OPUCn includes multiple data columns for carrying the client signals, where odd data columns are occupied by the ODTUCn.$1.2^x$, and even data columns are occupied by the ODTUCn.$1.2^y$.

With reference to all the foregoing implementation manners, in a fifth possible implementation manner, the overhead of the OPUCn includes an OPU multi-frame identifier OMFI, and eight bits of the OMFI are used to indicate an overhead location of each ODTUCn.$1.2^x$.

With reference to all the foregoing implementation manners, in a sixth possible implementation manner, a processing clock used by the OPUCn is homologous with a processing clock used by the ODTUCn.$1.2^x$.

According to a second aspect, an embodiment of the present invention provides a signal processing method, including: performing demultiplexing processing on a received optical channel payload unit OPUCn to determine an optical channel data tributary unit Cn ODTUCn.X including X tributary slots, where X is a non-integer; performing demapping processing on the ODTUCn.X to obtain a first ODUflex; and performing demapping processing on the first ODUflex to obtain a first client signal.

With reference to the second aspect, in a first possible implementation manner, the ODTUCn.X includes one or more ODTUCn.$1.2^x$s, where each ODTUCn.$1.2^x$ occupies $1/2^x$ of a tributary slot in the OPUCn, and x is equal to 1, 2, 3, 4, or 5.

With reference to all the implementation manners of the second aspect, in a second possible implementation manner, an overhead of the OPUCn includes a payload structure identifier PSI, the PSI includes a payload type PT identifier and a multiplex structure identifier MSI, the PT identifier is used to indicate that the OPUCn carries a client signal that occupies a non-integral quantity of tributary slots, and the MSI is used to indicate tributary slots occupied by the one or more ODTUCn.$1.2^x$s; and the performing demultiplexing processing on the OPUCn to determine an optical channel data tributary unit Cn ODTUCn.X including X tributary slots includes: determining, according to the PSI in the OPUCn obtained by parsing the OPUCn, the tributary slots occupied by the one or more ODTUCn.$1.2^x$s, to determine the ODTUCn.X.

With reference to all the implementation manners of the second aspect, in a third possible implementation manner, the overhead of the OPUCn includes an OPUCn multi-frame identifier OMFI, and eight bits of the OMFI are used to indicate overhead locations of the ODTUCn.$1.2^x$s; and the performing demapping processing on the ODTUCn.X to obtain a first ODUflex includes: determining overhead information of the one or more ODTUCn.1.2$^x$'s according to the OMFI in the OPUCn obtained by parsing the OPUCn, and performing demapping processing on the ODTUCn.X according to the determined overhead information, to obtain the first ODUflex.

According to a third aspect, a network apparatus is provided, where the network apparatus includes: a processing unit, configured to: map a received first client signal into a first ODUflex; map the first ODUflex into an optical channel data tributary unit Cn ODTUCn.X including X tributary slots, where X is a non-integer; and multiplex the ODTUCn.X into an optical channel payload unit Cn OPUCn.

With reference to the third aspect, in a first possible implementation manner, the processing unit includes: a first mapping unit, configured to map the received first client signal into the first ODUflex; a second mapping unit, configured to map the first ODUflex into the optical channel data tributary unit Cn ODTUCn.X including X tributary slots, where X is a non-integer; and a multiplexing unit, configured to multiplex the ODTUCn.X into the optical channel payload unit Cn OPUCn.

With reference to all the foregoing implementation manners of the third aspect, in a second possible implementation manner, the processing unit includes a processor and a computer readable medium; the computer readable medium stores a computer executable instruction; and when being executed by the processor, the instruction drives the processor to: map the received first client signal into the first ODUflex; map the first ODUflex into the optical channel data tributary unit Cn ODTUCn.X including X tributary slots, where X is a non-integer; and multiplex the ODTUCn.X into the optical channel payload unit Cn OPUCn.

With reference to all the foregoing possible implementation manners of the third aspect, in a third possible implementation manner, the ODTUCn.X includes one or more ODTUCn.1.2$^x$'s, where each ODTUCn.1.2$^x$ occupies 1/2$^x$ of a tributary slot in the OPUCn, and x is equal to 1, 2, 3, 4, or 5.

With reference to all the foregoing possible implementation manners of the third aspect, in a fourth possible implementation manner, an overhead of the OPUCn includes a payload structure identifier PSI, the PSI includes a payload type PT identifier and a multiplex structure identifier MSI, the PT identifier is used to indicate that the OPUCn carries a client signal that occupies a non-integral quantity of tributary slots, and the MSI is used to indicate tributary slots occupied by the one or more ODTUCn.1.2$^x$'s.

With reference to all the foregoing possible implementation manners of the third aspect, in a fifth possible implementation manner, at least one ODTUCn.1.2$^x$ that carries the first client signal and at least one ODTUCn.1.2$^y$ that carries another client signal share one tributary slot in the OPUCn, where each ODTUCn.1.2$^y$ occupies 1/2$^y$ of a tributary slot in the OPUCn, and y is equal to 1, 2, 3, 4, or 5; and optionally, one ODTUCn.1.2$^x$ and one ODTUCn.1.2$^y$ share one tributary slot in the OPUCn, where both x and y are equal to 1; and the shared tributary slot in the OPUCn includes multiple data columns for carrying the client signals, where odd data columns are occupied by the ODTUCn.1.2$^x$, and even data columns are occupied by the ODTUCn.1.2$^y$.

According to a fourth aspect, a network apparatus is further provided, including: a processing unit, configured to: perform demultiplexing processing on a received optical channel payload unit OPUCn to determine an optical channel data tributary unit Cn ODTUCn.X including X tributary slots, where X is a non-integer; perform demapping processing on the ODTUCn.X to obtain a first ODUflex; and perform demapping processing on the first ODUflex to obtain a first client signal.

With reference to the fourth aspect, in a first possible implementation manner, the processing unit includes: a demultiplexing unit, configured to perform demultiplexing processing on the received optical channel payload unit OPUCn to determine the optical channel data tributary unit Cn ODTUCn.X including X tributary slots, where X is a non-integer; a first demapping unit, configured to perform demapping processing on the ODTUCn.X to obtain the first ODUflex; and a second demapping unit, configured to perform demapping processing on the first ODUflex to obtain the first client signal.

With reference to all the implementation manners of the fourth aspect, in a second possible implementation manner, the processing unit includes a processor and a computer readable medium; the computer readable medium stores a computer executable instruction; and when being executed by the processor, the instruction drives the processor to: perform demultiplexing processing on the received optical channel payload unit OPUCn to determine the optical channel data tributary unit Cn ODTUCn.X including X tributary slots, where X is a non-integer; perform demapping processing on the ODTUCn.X to obtain the first ODUflex; and perform demapping processing on the first ODUflex to obtain the first client signal.

With reference to all the implementation manners of the fourth aspect, in a third possible implementation manner, the ODTUCn.X includes one or more ODTUCn.1.2$^x$'s, where each ODTUCn.1.2$^x$ occupies 1/2$^x$ of a tributary slot in the OPUCn, and x is equal to 1, 2, 3, 4, or 5.

With reference to all the implementation manners of the fourth aspect, in a fourth possible implementation manner, an overhead of the OPUCn includes a payload structure identifier PSI, the PSI includes a payload type PT identifier and a multiplex structure identifier MSI, the PT identifier is used to indicate that the OPUCn carries a client signal that occupies a non-integral quantity of tributary slots, and the MSI is used to indicate tributary slots occupied by the one or more ODTUCn.1.2$^x$'s; and the demultiplexing unit is specifically configured to determine, according to the PSI in the OPUCn obtained by parsing the OPUCn, the tributary slots occupied by the one or more ODTUCn.1.2$^x$'s, to determine the ODTUCn.X.

With reference to all the implementation manners of the fourth aspect, in a fifth possible implementation manner, the overhead of the OPUCn includes an OPUCn multi-frame identifier OMFI, and eight bits of the OMFI are used to indicate overhead locations of the ODTUCn.1.2$^x$'s; and the first demapping unit is specifically configured to determine overhead information of the one or more ODTUCn.1.2$^x$'s according to the OMFI in the OPUCn obtained by parsing the OPUCn, and perform demapping processing on the ODTUCn.X according to the determined overhead information, to obtain the first ODUflex.

According to a fifth aspect, a communications system is provided, where the communications system includes any one network apparatus provided in the fourth aspect and anyone network apparatus provided in the fifth aspect.

According to a sixth aspect, a computer readable medium is provided, where the computer readable medium is configured to store an instruction, and when being executed by a computer, the instruction drives the computer to execute any one method of the first aspect or the second aspect.

According to a seventh aspect, an optical transport network frame structure is provided, where the frame structure includes an optical channel payload unit Cn OPUCn overhead area and an OPUCn payload area, and the OPUCn includes a payload structure identifier PSI and an OPUCn multi-frame identifier OMFI, where the PSI is used to indicate tributary slots occupied by an optical channel data tributary unit Cn ODTUCn.X including X tributary slots, where X is a non-integer.

With reference to the seventh aspect, in a first implementation manner, the ODTUCn.X includes one or more ODTUCn.1.$2^x$s, where each ODTUCn.1.$2^x$ occupies $1/2^X$ of a tributary slot in the OPUCn, and x is equal to 1, 2, 3, 4, or 5; and the PSI is used to indicate a tributary slot occupied by each of the one or more ODTUCn.1.$2^x$s.

With reference to all the implementation manners of the seventh aspect, in a second implementation manner, the PSI is further used to indicate tributary slots occupied by an optical channel data tributary unit Cn ODTUCn.Y including Y tributary slots, where Y is a non-integer; the ODTUCn.Y includes one or more ODTUCn.1.$2^y$s, where each ODTUCn.1.$2^y$ occupies $1/2^y$ of a tributary slot in the OPUCn; one ODTUCn.1.$2^x$ and one ODTUCn.1.$2^y$ share one tributary slot in the OPUCn payload area, where both x and y are equal to 1; and the shared tributary slot in the OPUCn includes multiple data columns for carrying client signals, where odd data columns are occupied by the ODTUCn.1.$2^x$, and even data columns are occupied by the ODTUCn.1.$2^y$.

With reference to all the implementation manners of the seventh aspect, in a third implementation manner, eight bits of the OMFI are used to indicate an overhead location of each ODTUCn.1.$2^x$.

According to the signal processing method, network apparatus, communications system, and frame structure provided in the embodiments of the present invention, an ODTUCn.X that occupies a non-integral quantity of tributary slots of an OPUCn is used to carry a signal, so that a fine-grained service or a service with a bandwidth of a non-integer multiple of a tributary slot bandwidth of the OPUCn can be flexibly carried, carrying efficiency is high, implementation complexity is low, and a mapping and multiplexing processing architecture of an existing optical transport network is compatible. In addition, because there are less mapping steps, a delay caused by signal processing is short. Finally, a smaller tributary slot granularity in an existing framework is provided in the embodiments of the present invention, thereby improving mapping flexibility and extendibility.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 2A to FIG. 2D are a schematic diagram of an OTUCn multi-frame structure according to an embodiment of the present invention;

FIG. 5 is a schematic diagram of a PSI structure according to an embodiment of the present invention;

FIG. 6 is a schematic diagram of a specific meaning of a PSI structure according to an embodiment of the present invention;

FIG. 14 is a schematic diagram of a specific meaning of another PSI structure according to an embodiment of the present invention; and FIG. 15 is a schematic diagram of a specific meaning of still another PSI structure according to an embodiment of the present invention.

DETAILED DESCRIPTION

Figure 1A:
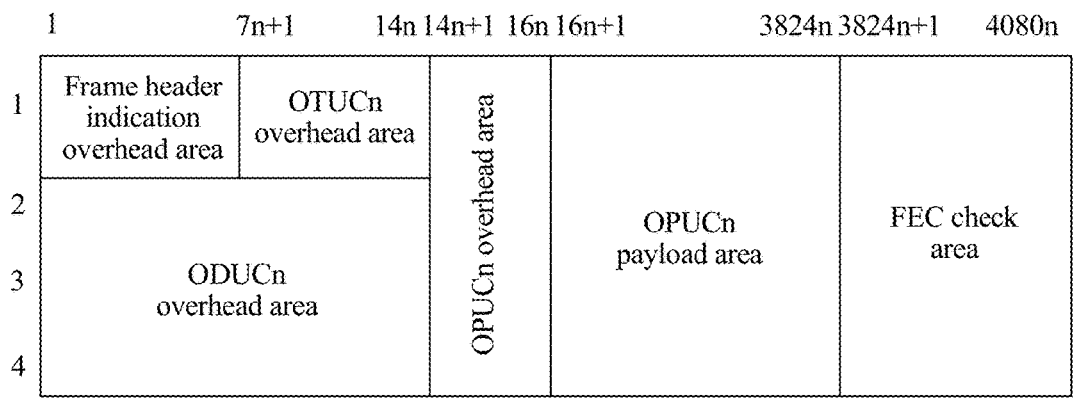
FIG. 1a is a schematic diagram of an OTUCn frame structure according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A method, an apparatus, and a system provided in the embodiments of the present invention are all based on a same principle and design. Aspects described in the embodiments of the present invention may be combined with each other as long as they do not conflict with each other or are not concurrent. This is not limited in the embodiments of the present invention. For example, an aspect A is described in a part, and an aspect B is described in another part; as long as the aspect A and the aspect B do not conflict with each other, or are not two concurrent solutions, the aspect A and the aspect B may be combined by default. Specifically, for example, the apparatus described in an embodiment of the present invention may have all functions mentioned in the method described in an embodiment of the present invention, to be configured to implement the corresponding method. Similarly, the method described in the embodiment of the present invention may be implemented by using the apparatus in the embodiment of the present invention. The frame structure described in an embodiment of the present invention is universal for the method and the apparatus, and the frame structure and the method or the apparatus may be combined with each other.

For an OTN technology, the International Telecommunication Union has developed corresponding standards, such as G.709/Y.1331 published in February, 2012, and all content of the standard is incorporated in this application document.

Transmission frames at multiple rates have been defined in the existing standards, such as an optical channel data unit k (Optical channel Data Unit-k, ODUk) frame, an optical channel payload unit k (Optical channel Payload Unit-k, OPUk) frame, and a completely standardized optical channel transport unit k (completely standardized Optical channel Transport Unit-k, OTUk) frame. When k is equal to 0, it indicates that a bit rate level is 1.25 Gbit/s; when k is equal to 1, it indicates that a bit rate level is 2.5 Gbit/s; when k is equal to 2, it indicates that a bit rate level is 10 Gbit/s; when k is equal to 3, it indicates that a bit rate level is 40 Gbit/s; when k is equal to 4, it indicates that a bit rate level is 100 Gbit/s; and when k is equal to flex, it indicates that a bit rate may be flexibly configured. For more details about existing OTN transmission frames, refer to G.709/Y.1331 published in February, 2012.

To meet a requirement for transporting an upper-layer service with ever growing traffic, currently, the International Telecommunication Union is discussing to develop a new optical channel transport unit Cn OTUCn frame of a rate exceeding 100G, where C is a Roman numeral representing 100, and n represents a multiple. For example, an OTUC1 represents a transmission frame corresponding to a transmission rate of 100G, an OTUC2 represents a transmission frame corresponding to a transmission rate of 200G, and the rest may be deduced by analogy.

As shown in FIG. 1a, an OTUCn frame structure includes four rows and 4080*n columns. An optical channel payload unit Cn OPUCn payload area and an OPUCn overhead area constitute an OPUCn frame; the OPUCn frame and an optical channel data unit Cn ODUCn overhead area constitute an ODUCn frame; and the ODUCn frame, an OTUCn overhead area, a frame header indication overhead area FAS, and an FEC check area constitute an OTUCn frame. Specifically, columns 1 to 7n of row 1 are the frame header indication overhead; columns (7n+1) to 14n of row 1 are the OTUCn overhead area; columns 1 to 14n of rows 2 to 4 are the ODUCn overhead area; columns (14n+1) to 16n of rows 1 to 4 are the OPUCn overhead area; columns (16n+1) to 3824n of rows 1 to 4 are the OPUCn payload area; and columns (3824n+1) to 4080n of rows 1 to 4 are the FEC check area.

Figure 1B:
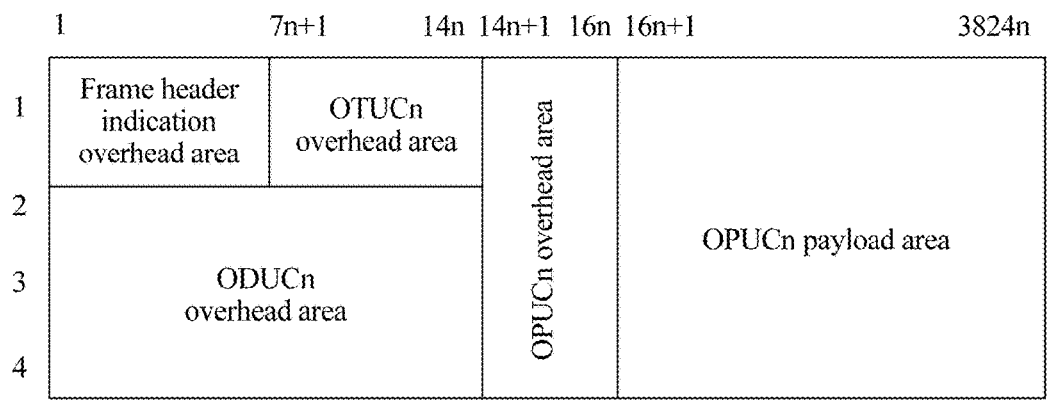
FIG. 1b is a schematic diagram of another OTUCn frame structure according to an embodiment of the present invention.

As shown in FIG. 1b, FIG. 1b shows another OTUCn frame structure. The OTUCn frame structure includes four rows and 3824*n columns, but has no FEC check area. Columns 1 to 7n of row 1 are a frame header indication overhead; columns (7n+1) to 14n of row 1 are an OTUCn overhead area; columns 1 to 14n of rows 2 to 4 are an ODUCn overhead area; columns (14n+1) to 16n of rows 1 to 4 are an OPUCn overhead area; and columns (16n+1) to 3824n of rows 1 to 4 are an OPUCn payload area. An OPUCn frame structure is in columns (14n+1) to 3824n of rows 1 to 4.

No matter in which OTUCn frame structure, the included OPUCn payload area includes 10n tributary slots (Tributary Slot), and each tributary slot has a 10G bandwidth and can be used to carry a 10G service. For a service of a rate that is greater than 10G and is exactly an integer multiple of 10G, the service may be carried by using an exactly integral quantity of tributary slots, and carrying efficiency is high. However, for a service of a relatively low rate or of a rate that is not an integer multiple of 10 G, when the service is carried by using an OTUCn frame in a multilevel multiplexing manner, there are problems of high complexity and a relatively long delay; and if the service is carried by directly using an OTUCn frame, bandwidth utilization is relatively low. The foregoing case is described below by assuming that a 25G service is carried by using an OTUCn frame.

In an implementation manner, an ODUflex and a High Order ODUk in the existing standard may be used to perform two-level multiplexing, to carry the 25G service. Specifically, first, a client signal at a rate of 25G is mapped into an ODUflex (at a rate of 25G) in a Bit-synchronous Mapping Procedure BMP manner (or another manner described in G.709/Y.1331). Then, the ODUflex at a rate of 25G is mapped into an optical channel data tributary unit ODTU (such as an ODTUk.20, that is, the ODTU occupies twenty 1.25G tributary slots of an OPUk, where k=3 or 4) in a Generic Mapping Procedure GMP manner (or in another manner). Then, the ODTU is multiplexed into a higher order HO OPUk, and the HO OPUk is mapped into an optical channel data tributary unit Cn ODTUCn.ts (that is, a virtual container that occupies is 10G tributary slots). Finally, the ODTUCn.ts is multiplexed into an OPUCn. Therefore, carrying the 25G service in the multilevel multiplexing manner needs many processing steps. As a result, system complexity is increased, and a relatively long delay is caused.

In another implementation manner, a client signal at a rate of 25G is first mapped into an ODUflex (at a rate of 25G) in a Bit-synchronous Mapping Procedure BMP manner (or in another manner). Then, the ODUflex (at a rate of 25G) is mapped into an ODTUCn.3 (that is, a virtual container that occupies three 10G tributary slots of an OPUCn) in a GMP asynchronous mapping manner (or in another manner). Finally, the ODTUCn.3 is multiplexed into the OPUCn. In this implementation manner, the 25G client signal occupies three 10G tributary slots, there is a waste of a 5G bandwidth, and there is a problem of relatively low carrying efficiency.

An embodiment of the present invention further provides an implementation manner. A coarse-grained tributary slot (such as a tributary slot with a 10G bandwidth) is partitioned into smaller carrying units, such as carrying units that occupy a 1.25G bandwidth, carrying units that occupy a 2.5G bandwidth, or carrying units that occupy a 5G bandwidth; and each corresponding carrying unit occupies one eighth of the tributary slot, occupies one fourth of the tributary slot, or occupies one half of the tributary slot. In this manner, the coarse-grained tributary slot may be used to carry a low-rate service, or carry a service with a bandwidth of a non-integer multiple of a single tributary slot bandwidth. Carrying efficiency is high, and processing complexity is relatively low.

An embodiment of the present invention provides a signal processing method. The method includes: mapping a received first client signal into a first ODUflex; mapping the first ODUflex into an optical channel data tributary unit Cn ODTUCn.X including X tributary slots, where X is a non-integer; and multiplexing the ODTUCn.X into an optical channel payload unit Cn OPUCn. The OPUCn herein may refer to an OPUCn multi-frame, such as a 10-OPUCn multi-frame or a 256-OPUCn multi-frame.

Optionally, the ODTUCn.X includes one or more ODTUCn.1.$2^x$s, where each ODTUCn.1.$2^x$ occupies $1/2^x$ of a tributary slot in the OPUCn, and x is equal to 1, 2, 3, 4, or 5.

An overhead of the OPUCn includes a payload structure identifier PSI, the PSI includes a payload type PT identifier and a multiplex structure identifier MSI, the PT identifier is used to indicate that the OPUCn carries a client signal that occupies a non-integral quantity of tributary slots, and the MSI is used to indicate tributary slots occupied by the one or more ODTUCn.1.$2^x$s.

Optionally, the method may further include: mapping a received second client signal into a second ODUflex; mapping the second ODUflex into an optical channel data tributary unit Cn ODTUCn.Z including Z tributary slots, where Z is an integer; and multiplexing the ODTUCn.Z into the OPUCn.

Optionally, at least one ODTUCn.1.$2^x$ that carries the first client signal and at least one ODTUCn.1.$2^y$ that carries another client signal share one tributary slot in the OPUCn, where each ODTUCn.1.$2^y$ occupies $1/2^y$ of a tributary slot in the OPUCn, and y is equal to 1, 2, 3, 4, or 5. Optionally, one ODTUCn.1.$2^x$ and one ODTUCn.1.$2^y$ share one tributary slot in the OPUCn, where both x and y are equal to 1; and the shared tributary slot in the OPUCn includes multiple data columns for carrying the client signals, where odd data columns are occupied by the ODTUCn.1.$2^x$, and even data columns are occupied by the ODTUCn.1.$2^y$.

The overhead of the OPUCn includes an OPU multi-frame identifier OMFI, and eight bits of the OMFI are used to indicate overhead locations of the ODTUCn.1.$2^x$s.

A processing clock used by the OPUCn is the same as a processing clock used by the ODTUCn.1.$2^x$.

Before the method in this embodiment of the present invention is described in detail, tributary slot division of an OPUCn and construction of an ODTUCn mentioned in this embodiment of the present invention are described first in this application with reference to the specific accompanying drawings.

FIG. 2A to FIG. 2D show a tributary slot division manner when an OPUCn has padding columns. Ten OPUCn frames constitute a 10-OPUCn multi-frame, and the multi-frame includes 40 rows and 3824 columns. Columns 16n+1 to 3816n of a payload area of the multi-frame are sequentially divided into 10n 10G tributary slots at intervals of columns, the tributary slots are numbered as TS A.B (where A=1, . . . , n and B=1, . . . , 10; for example, 1.1, 2.1, . . . , n.1, 1.2, 2.2, . . ., till n.10), and each tributary slot includes 40 rows and 380 columns. Columns 16n+1 to 3816n are data columns for carrying a client signal, and columns 3816n+1 to 3824n are padding columns.

Tributary slot overheads are located in columns 14n+1 to 16n. When a corresponding client signal occupies an integral quantity of tributary slots, and a tributary slot overhead corresponding to each tributary slot is available once every ten OPUCn frames, and is indicated by bits 5 to 8 in an OPU multi-frame identifier (OPU Multi-Frame Identifier, OMFI) (a value of bits 5 to 8 is 0 initially, is incremented consecutively in a unit of OPUCn frame, is turned to 0 on a next OPUCn frame when a current frame is counted to 9, and is in a circle from 0 to 9 consecutively), as shown in FIG. 2A to FIG. 2D. If a corresponding client signal occupies a non-integral quantity of tributary slots, one tributary slot may be occupied by multiple different client signals. In this case, although an OMFI corresponding to the tributary slot is still available once every ten OPUCn frames, for a same client signal, overhead information corresponding to the client signal maybe available once every twenty OPUCns, every forty OPUCns, or every eighty OPUCn frames. In this case, eight bits of the OMFI need to be used to indicate a location and belongingness of the corresponding overhead information, and reference may be made to the following descriptions for details. For a tributary slot TS A.B, a tributary slot overhead corresponding to the tributary slot TS A.B is located in rows 1 to 3 of column 14n+A and column 15n+A of the B$^{th}$ OPUCn frame of the 10-OPUCn multi-frame. There are six bytes in total, and the six bytes are labeled as J1, J2, J3, J4, J5, and J6. For example, for a TS 2.3 (A=2, B=3), an overhead of the TS 2.3 is located in rows 1 to 3 of column 14n+2 and column 15n+2 of the third OPUCn frame of the 10-OPUCn multi-frame.

Figure 3:
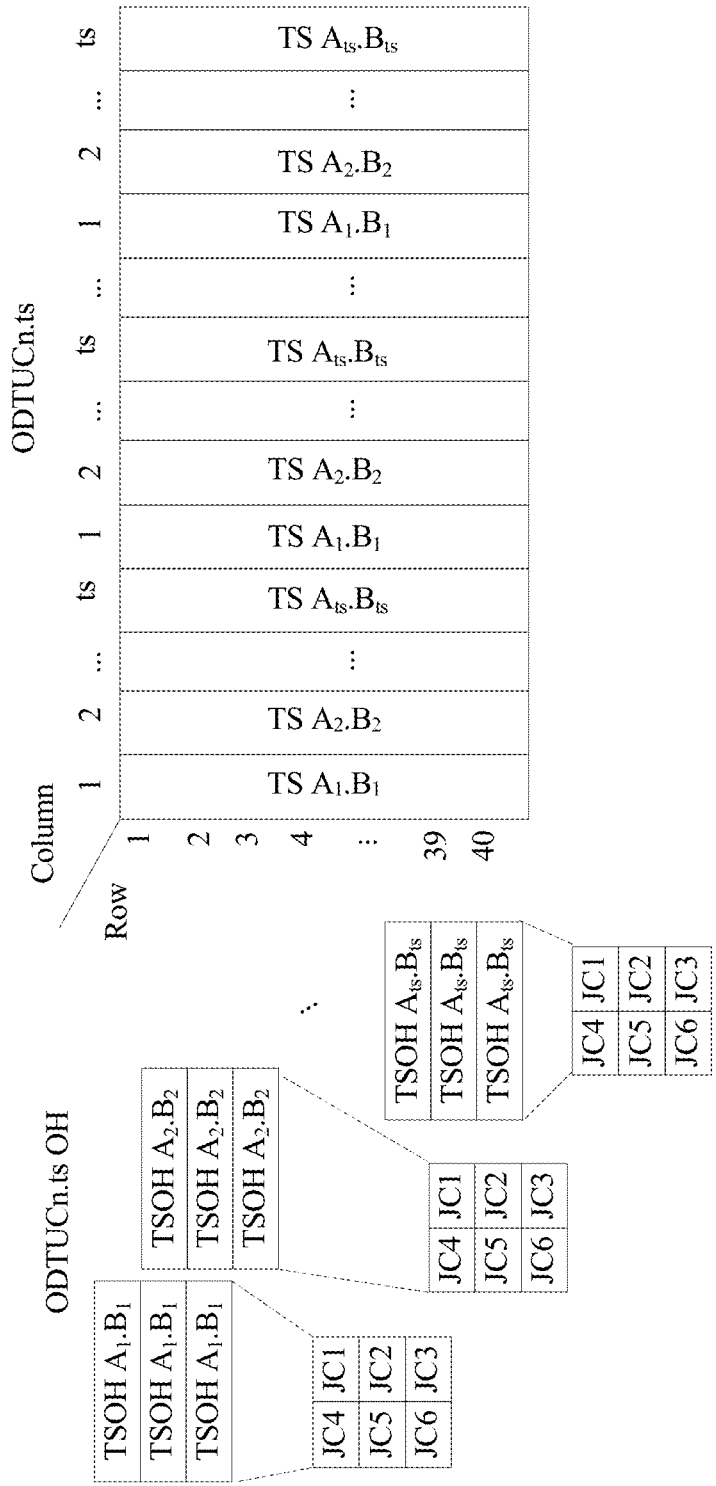
FIG. 3 is a schematic diagram of an ODTUCn.ts structure according to an embodiment of the present invention.

An ODTUCn.ts (the same as the foregoing ODTUCn.X) structure includes ts tributary slots of the 10-OPUCn multi-frame and corresponding tributary slot overheads, and includes 40 rows, 380*ts columns, and tributary slot overheads corresponding to the ts tributary slots. The ODTUCn.ts structure is shown in FIG. 3. Optionally, a tributary slot overhead corresponding to one tributary slot may be used to place mapping overhead information. For example, the last tributary slot is selected, that is, tributary slot coding corresponding to the last tributary slot is $A_{ts}.B_{ts}$, where $B_{ts}$ is a maximum value of coding B of tributary slots included in the ODTUCn.ts, and $A_{ts}$ is a maximum value of coding A of a tributary slot having the maximum value of coding B.

Figure 4:
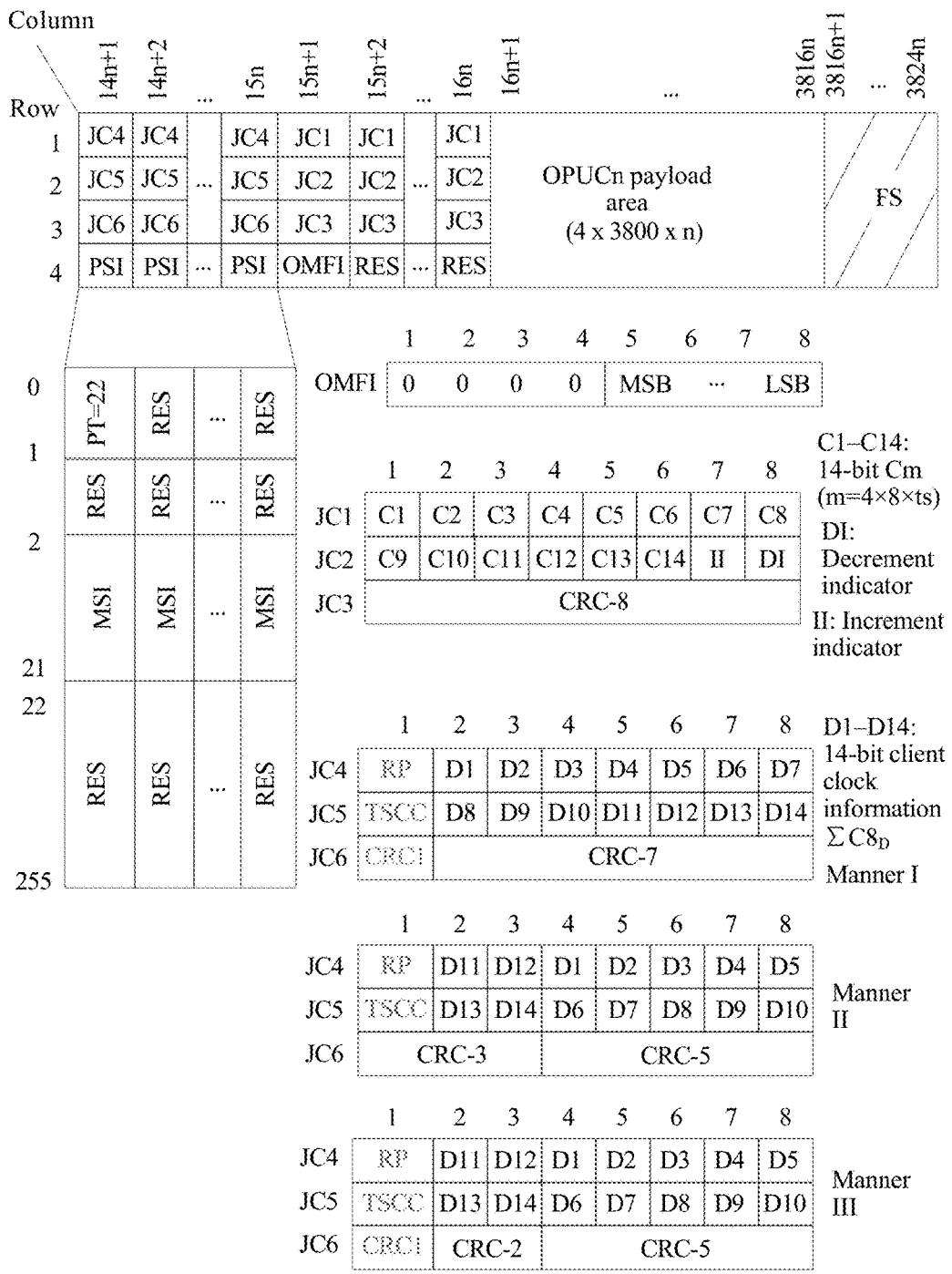
FIG. 4 is a schematic diagram of an OPUCn overhead structure according to an embodiment of the present invention.

To further confirm which is tributary slots in the 10-OPUCn multi-frame and corresponding tributary slot overheads constitute the ODTUCn.ts, an allocation status of tributary slots in an OPUCn signal may be determined according to a payload structure identifier PSI (Payload Structure Identifier) of a 256-multi-frame (Multi-Frame) of the OPUCn signal, so as to determine the ODTUCn.ts. As shown in FIG. 4, a PSI is located in columns 14n+1 to 15n of row 4, that is, an area labeled by MSIs in the figure. A single byte of the area is labeled as PSI [x.y] (where x=2, . . . , 21, and y=1, . . . , n), and allocation statuses of 10n tributary slots are separately indicated by using all PSI[x.y]. An MSI is a multiplex structure identifier (MSI), and is located in column 15n+1 of row 4, as shown in FIG. 4. Bits 5 to 8 of an OMFI indicate an OPUCn 10 multi-frame, an initial value is 0, the value is incremented by 1 from 0 to 9 consecutively for each OPUCn frame, and one cycle of 0 to 9 represents one OPUCn 10 multi-frame; MSB is a most significant bit (MSB), and LSB is a least significant bit (LSB).

It should be noted that, for an indication manner of mapping overhead information $C_{8D}$ in FIG. 4, bits 2 and 3 in rows 1 and 2 in the figure are extended. In the existing standard, bits 2 and 3 in rows 1 and 2 in the figure are reserved fields, and in this embodiment of the present invention, the reserved fields are used to carry the mapping overhead information $C_{8D}$. By extending bits 2 and 3 in rows 1 and 2, $C_{8D}$ in the present invention can carry more mapping overhead information, thereby improving utilization of overhead fields, and providing effective overhead information for superspeed communication.

FIG. 5 is a mapping between PSI [x.y] and a 10G tributary slot. That is, PSI[2.1] to PSI[21.1] in column 14n+1 indicate tributary slots TS 1.1 to TS 1.10, PSI [2.2] to PSI [21.2] in column14n+2 indicate tributary slots TS 2.1 to TS 2.10, the rest may be deduced by analogy, and PSI[2.n] to PSI [21.n] in column 15n indicate tributary slots TS n.1 to n.10.

FIG. 6 is a schematic diagram of an overhead of a PSI according to an embodiment of the present invention. Each tributary slot indication occupies two bytes. Bit 1 of byte 1 indicates whether a corresponding tributary slot is occupied (Occupation), if the corresponding tributary slot is occupied, a value 1 is assigned; otherwise, a value 0 is assigned. Bits 2 to 8 of byte 1 and bits 1 to 8 of byte 2, fifteen bits in total, indicate a tributary port number (Tributary Port) allocated to the corresponding tributary slot, that is, a low order LO ODU (such as an ODUflex) service indicator carried in the tributary slot. When the OPUCn signal carries an LO ODU service by using a 10G tributary slot grain, a payload type (Payload Type, PT) is assigned a value of 0x22, and is located in column 14n+1 of row 4. When the OPUCn signal carries an ODUflex service of a rate of a non-integer multiple of 10G (for example, by using a 5G tributary slot grain), the payload type (PT) is assigned a value of 0x23, and is located in column 14n+1 of row 4.

The ODTUCn.X in this embodiment of the present invention may include one or more ODTUCn.1.2$^x$s, where each ODTUCn.1.2$^x$ occupies 1/2$^x$ of a tributary slot in the OPUCn, and x is equal to 1, 2, 3, 4, or 5. In the existing standard, the PSI describes a tributary port of a tributary slot by using two bytes, and tributary slots belonging to a same port are occupied by a same ODTUCn. When a tributary slot is subdivided into smaller tributary slots, an existing PSI may be extended. For example, when one tributary slot is divided into two smaller subdivided tributary slots, one byte of the PSI may be used to describe a tributary port to which one subdivided tributary slot belongs. When one tributary slot is divided into four or eight subdivided tributary slots, an existing PSI reserved field may be extended to describe a tributary port to which a corresponding subdivided tributary slot belongs.

One ODTUCn may be configured to map a service or a signal from one tributary port. That is, one ODTUCn corresponds to one particular tributary port. In this embodiment of the present invention, one ODTUCn.1.2$^x$ may occupy one divided tributary slot, and may be considered as one mapping container, and a corresponding ODUflex signal or Ethernet service may be mapped into the mapping container. Because one ODTUCn may include one or more ODTUCn.1.2$^x$s, ODTUCn.1.2$^x$s constituting a same ODTUCn have a mapping with a same tributary port. As described above, a particular PSI field is corresponding to a particular tributary slot or subdivided tributary slot, and the particular PSI field indicates a tributary port to which the particular tributary slot or subdivided tributary slot belongs. Further, because the particular tributary port is corresponding to the one or more ODTUCn.1.2$^x$s constituting the same ODTUCn, a corresponding PSI indicates subdivided tributary slots occupied by the one or more ODTUCn.1.2$^x$s constituting the same ODTUCn.

In the method provided in this embodiment of the present invention, a service that occupies a bandwidth of an integer multiple of a tributary slot bandwidth and a fine-grained service or a service that occupies a bandwidth of a non-integer multiple of the tributary slot bandwidth may be simultaneously transmitted in a mixed manner.

The following describes in detail how to efficiently transmit a fine-grained service or a service with a bandwidth of a non-integer multiple of a tributary slot bandwidth by using an existing high bandwidth tributary slot.

In this embodiment of the present invention, a function of dividing a single OPUCn 10G tributary slot is added. In an OTN processing procedure, corresponding to-be-mapped data needs to be first mapped into an ODTUCn.ts, where ts is a quantity of OPUCn tributary slots occupied by the ODTUCn.ts, and then the ODTUCn.ts is multiplexed into an OPUCn. Usually, a minimum granularity for mapping the to-be-mapped data into the ODTUCn.ts is an ODTUCn.1, that is, one tributary slot is occupied. In this embodiment of the present invention, the ODTUCn.1 is further divided. For example, one 10 G ODTUCn.1 is divided into two smaller grains ODTUCn.1.2s, and each ODTUCn.1.2 occupies one half of the tributary slot, and occupies a 5G bandwidth. Similarly, one 10G ODTUCn.1 may be divided into four smaller grains ODTUCn.1.4s, and each ODTUCn.1.4 occupies one fourth of the tributary slot, and occupies a 2.5G bandwidth. Alternatively, one 10G ODTUCn.1 is divided into eight smaller grains ODTUCn.1.8s, and each ODTUCn.1.2 occupies one eighth of the tributary slot, and occupies a 1.25G bandwidth, and the rest may be deduced by analogy.

Description is provided below by assuming that the ODTUCn.1 is divided into two ODTUCn.1.2s, and another grain is similar. The ODTUCn.1.2 may have the following two structures.

Figure 7:
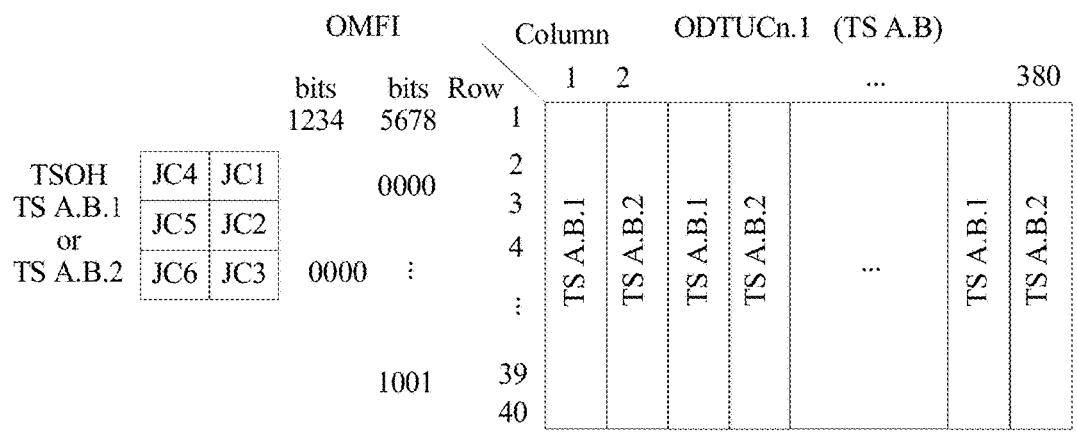
FIG. 7 is a schematic diagram of an ODTUCn.1.2 structure according to an embodiment of the present invention.
Figure 10A:
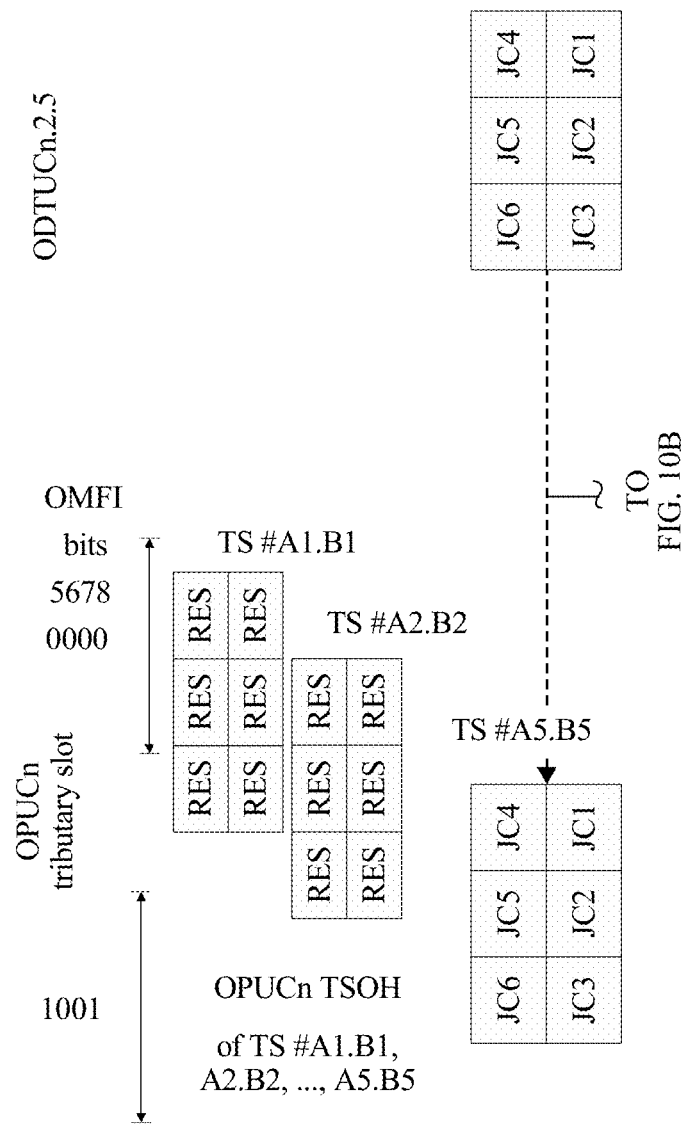
FIG. 10A to FIG. 10B are a schematic diagram of a process in which another ODUflex (25GE) is mapped into an OPUCn according to an embodiment of the present invention.
Figure 10B:
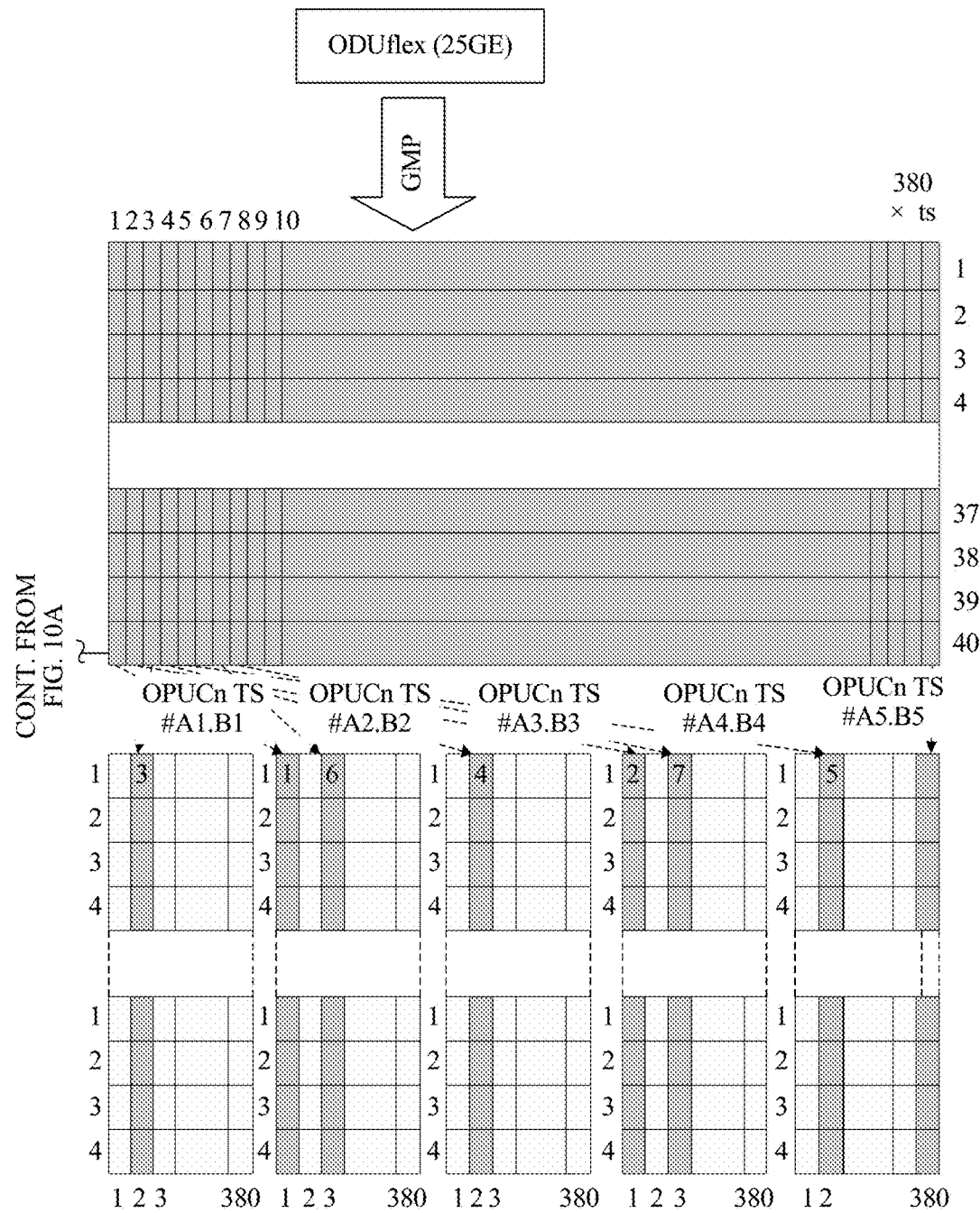

The first ODTUCn.1.2 structure: such an ODTUCn.1.2 structure is based on one ODTUCn.1 (40 rows and 380 columns). As shown in FIG. 7, the tributary slot occupied by the ODTUCn.1 is divided by column, and two structures of 40 rows and 190 columns may be obtained. For the two structures ODTUCn.1.2s of 40 rows and 190 columns, a tributary slot occupied by each ODTUCn.1.2 may be labeled as a TS A.B.1 and a TS A.B.2. As shown in FIG. 10A to FIG. 10B, each ODTUCn.1.2 occupies a 5G tributary slot. The ODTUCn.1.2 includes a payload area of 40 rows and 190 columns and corresponding overhead information.

Figure 8:
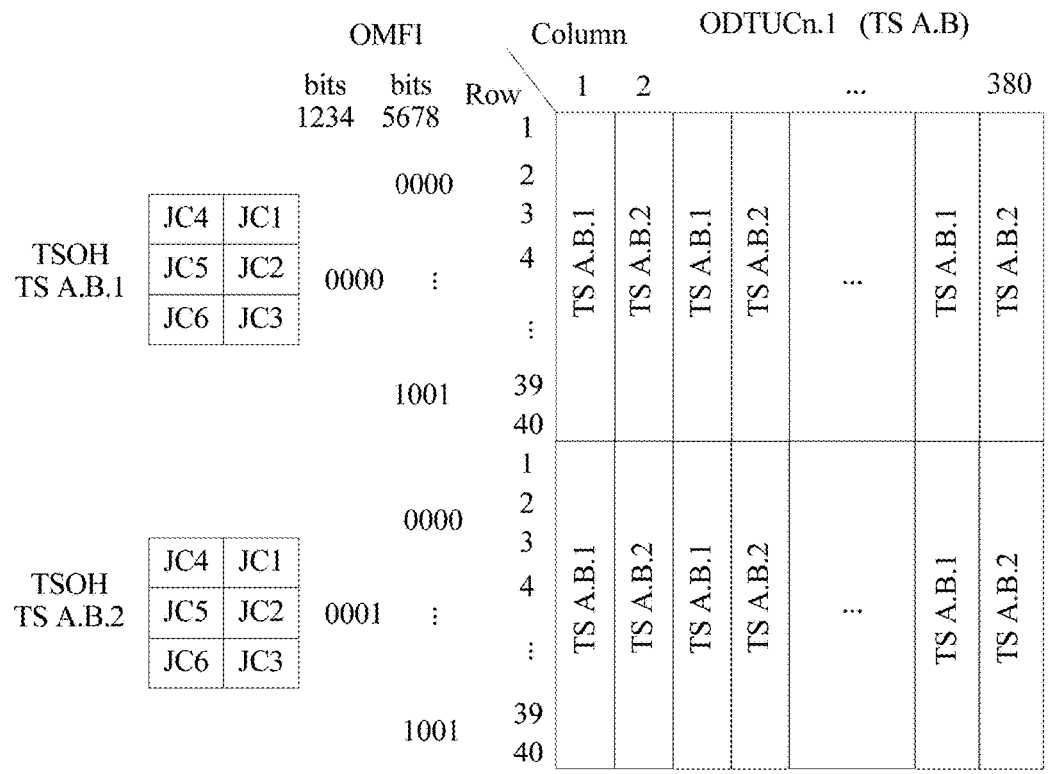
FIG. 8 is a schematic diagram of another ODTUCn.1.2 structure according to an embodiment of the present invention.

The second ODTUCn.1.2 structure: such an ODTUCn.1.2 structure is based on two ODTUCn.1s (80 rows and 380 columns). 5G tributary slot division is performed at intervals of columns, and tributary slots are labeled as A.B.C. A tributary slot A.B.1 and a tributary slot A.B.2 are obtained through division. As shown in FIG. 8, each 5G tributary slot forms an ODTUCn.1.2. That is, the ODTUCn. 1 is divided into two ODTUCn.1.2s. An ODTUCn.1.2 structure includes 80 rows and 190 columns, and a tributary slot overhead corresponding to the tributary slot.

An OMFI is extended: bits 1 to 4 of the OMFI are extended, an initial value is 0, and the value is incremented by 1 from 0 to 15 consecutively for each OPUCn 10 multi-frame. Tributary slot overheads indicate overhead locations of tributary slots with a smaller grain of the extended ODTUCn.1.X. For an indication meaning of an extended OMFI, refer to Table 1.

TABLE 1

| OMFI overhead indication | | |
|---|---|---|
| OMFI bits 1234 | OMFI bits 5678 | TSOH 5G TS A.B.C |
| 0000 | 0000 | 1.1.1, 2.1.1 to n.1.1 |
|  | 0001 | 1.2.1, 2.2.1 to n.2.1 |
|  | ... | ... |
|  | 1001 | 1.10.1, 2.10.1 to n.10.1 |

TABLE 1-continued

OMFI overhead indication

| OMFI bits 1234 | OMFI bits 5678 | TSOH 5G TS A.B.C |
|---|---|---|
| 0001 | 0000 | 1.1.2, 2.1.2 to n.1.2 |
|  | 0001 | 1.2.2, 2.2.2 to n.2.2 |
|  | ... | ... |
|  | 1001 | 1.10.2, 2.10.2 to n.10.2 |
| ... | ... | ... |
| 1110 | 0000 | 1.1.1, 2.1.1 to n.1.1 |
|  | 0001 | 1.2.1, 2.2.1 to n.2.1 |
|  | ... | ... |
|  | 1001 | 1.10.1, 2.10.1 to n.10.1 |
| 1111 | 0000 | 1.1.2, 2.1.2 to n.1.2 |
|  | 0001 | 1.2.2, 2.2.2 to n.2.2 |
|  | ... | ... |
|  | 1001 | 1.10.2, 2.10.2 to n.10.2 |

The following describes in detail the method provided in this embodiment of the present invention with reference to the accompanying drawings.

Carrying a 25G Ethernet service by using multiple 10G tributary slots is used as an example. It should be noted that, a bandwidth of each tributary slot and a bandwidth of the corresponding carried service herein are merely an example. For example, multiple 5G tributary slots may carry a 7.5G service, or a 20G tributary slot carries a 10G service. This is not limited.

Optionally, first, a received 25GE client signal, such as an Ethernet service signal, is mapped into a first ODUflex, where a rate of the first ODUflex may be 25G. A mapping manner herein may be an existing Bit-synchronous Mapping Procedure BMP mapping manner, or may be another mapping manner described in G.709/Y.1331. This is not limited in this embodiment of the present invention.

Then, the first ODUflex is mapped into an ODTUCn.X, where X is a non-integer, and X herein indicates that the ODTUCn.X occupies X tributary slots in a corresponding OPUCn. The first ODUflex that carries 25GE is used as an example. If a rate of each tributary slot in the corresponding OPUCn is 10G, X in the ODTUCn.X herein should be equal to 2.5. A mapping manner herein is preferably Generic Mapping Procedure GMP mapping, or may be another mapping manner described in G.709/Y.1331. This is not limited in this embodiment of the present invention.

It should be noted that, mapping the client signal into the first ODUflex is an optional step. For example, the received 25 GE signal may be directly mapped into a corresponding ODTUCn.X. A mapping method is the same as a method for mapping the first ODUflex into the ODTUCn.X, because for the ODTUCn.X, both the first ODUflex and the directly received Ethernet signal are a service signal or a client signal.

Finally, the ODTUCn.X is multiplexed into an OPUCn. Then, the OPUCn finally forms an OTUCn, and the OTUCn is sent.

The following describes in detail the step of mapping the first ODUflex into the ODTUCn.X.

A 25GE service is used as an example. In an OTN system with a tributary slot rate of 10G, an existing minimum tributary slot needs to be further divided. For a further divided minimum grain or tributary slot in this embodiment of the present invention, the minimum grain or tributary slot may occupy less than one tributary slot. For example, the minimum grain may occupy 0.3 of the tributary slot, or 0.6, 0.7, or 0.75 of the tributary slot. Preferably, the divided fine grain or tributary slot may be referred to as an ODTUCn.1.2$^x$, each ODTUCn.1.2$^x$ occupies 1/2$^x$ of a tributary slot in the OPUCn, and x is equal to 1, 2, 3, 4, 5, or the like. Correspondingly, the ODTUCn.X may include one or more ODTUCn.1.2$^x$s. A 25GE service is used as an example. The ODTUCn.X may be an ODTUCn.2.5, and the ODTUCn.2.5 may include five ODTUCn.1.2s.

Figure 9A:
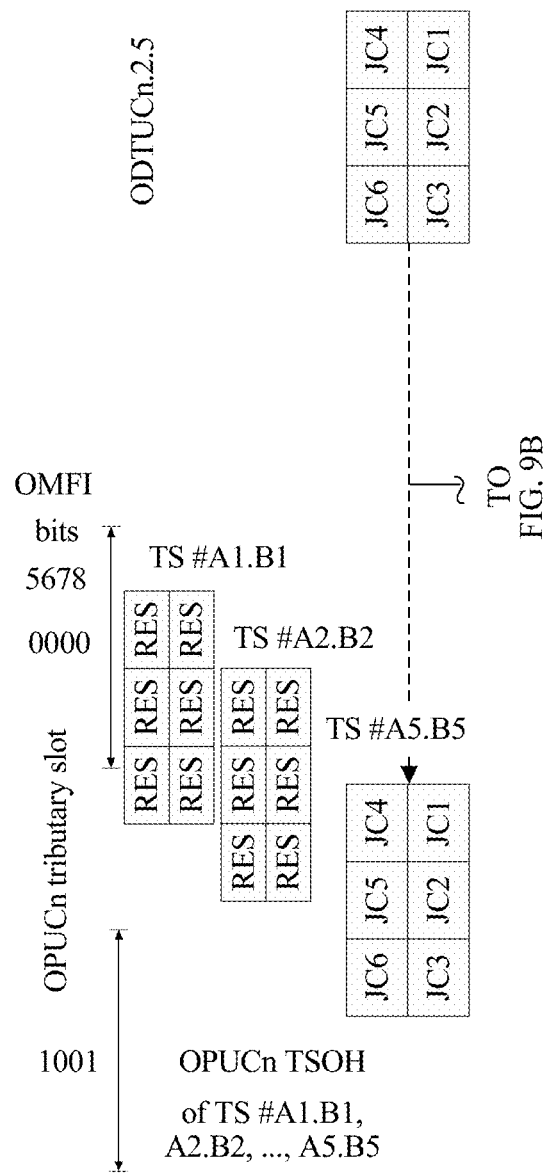
FIG. 9A to FIG. 9B are a schematic diagram of a process in which one ODUflex (25GE) is mapped into an OPUCn according to an embodiment of the present invention.
Figure 9B:
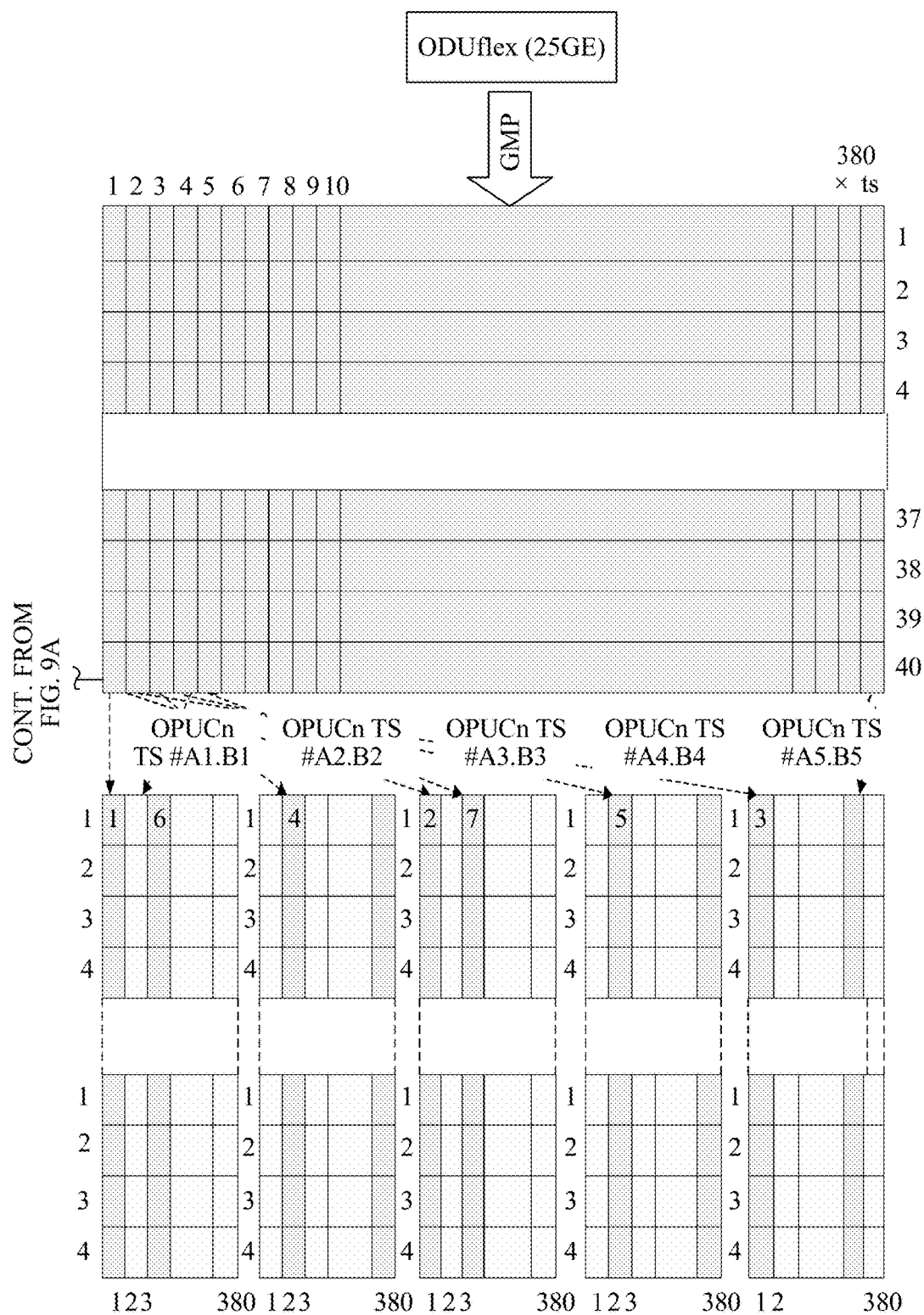

Specifically, an ODTUCn.1 container may be divided into two 5G ODTUCn.1.2s, where an ODTUCn.1.2 keeps homologous with an OPUCn processing clock, and preferably, uses a processing clock the same as that of the OPUCn. The first ODUflex (25GE) occupies five ODTUCn.1.2s, and an ODTUCn.2.5 is obtained (that is, occupies two and a half 10G TSs of the OPUCn). Because the to-be-mapped service first ODUflex (25GE) is at a rate of 25G, five ODTUCn.1.2s need to be occupied. The five ODTUCn.1.2s constitute a carrying container ODTUCn.2.5. The calculation process is: (10/2)*5/10=5/2=2.5. First, 10 is divided by 2, to obtain a 5G rate of each divided fine-grained ODTUCn.1.2. Then, (10/2) is multiplied by 5, to represent that the ODUflex (25GE) needs to occupy five ODTUCn.1.2s, and the five ODTUCn.1.2s constitute the container ODTUCn.2.5. (10/2)*5 is divided by 10, to represent a quantity of OPUCn tributary slots that the ODTUCn.2.5 needs to occupy, where each tributary slot of the OPUCn herein represents a 10G bandwidth. Then, the first ODUflex (25GE) may be mapped into the ODTUCn.2.5 in a GMP manner, and a mapping overhead (or referred to as overhead information) is added to an ODTUCn.2.5 overhead area. A mapping granularity herein may be ten bytes, or five bytes, or twenty bytes, or a mapping granularity of other bytes. Specific mapping overhead information Cm and CnD is shown in FIG. 9A to FIG. 9B.

The following describes in detail the step of multiplexing the ODTUCn.X into the OPUCn with reference to the accompanying drawings.

In this embodiment of the present invention, at least one ODTUCn.1.2$^x$ that carries the first client signal and at least one ODTUCn.1.2$^y$ that carries another client signal share one tributary slot in the OPUCn, where each ODTUCn.1.2$^y$ occupies 1/2$^y$ of a tributary slot in the OPUCn, and y is equal to 1, 2, 3, 4, or 5. That is, different fine-grained services or services with a non-integer multiple of a tributary slot bandwidth may share one tributary slot in the OPUCn. For example, a service A occupies a 5G bandwidth of a 10G tributary slot, and a service B occupies the other 5G bandwidth of the same tributary slot; or the service A occupies a 7.5G bandwidth, and the service B occupies a 2.5G bandwidth. A specific ratio of bandwidths occupied by different services is not limited in this embodiment of the present invention. Optionally, more than two services may share one tributary slot. For example, four or eight different service signals share one tributary slot. Optionally, one ODTUCn.1.2$^x$ and one ODTUCn.1.2$^y$ may share one tributary slot in the OPUCn, where both x and y are equal to 1; and the shared tributary slot in the OPUCn includes multiple data columns for carrying the client signals, where odd data columns are occupied by the ODTUCn.1.2$^x$, and even data columns are occupied by the ODTUCn.1.2$^y$. An odd-even column interleaving manner may reduce a service signal delay.

As shown in FIG. 9A to FIG. 9B and FIG. 10A to FIG. 10B, X is 2.5, and an ODTUCn.2.5 structure in the figure is 40 rows and 950 columns.

When one ODUflex (25GE) occupies one half of a container of an ODTUCn.5, a mapping and multiplexing processing procedure of the ODUflex (25GE) is shown in FIG. 9A to FIG. 9B. The other remaining half of the container, that is, an ODTUCn.2.5, may be used to carry the other ODUflex (25GE), and a mapping and multiplexing processing procedure of the other ODUflex (25GE) is shown in FIG. 10A to FIG. 10B.

Figure 11A:
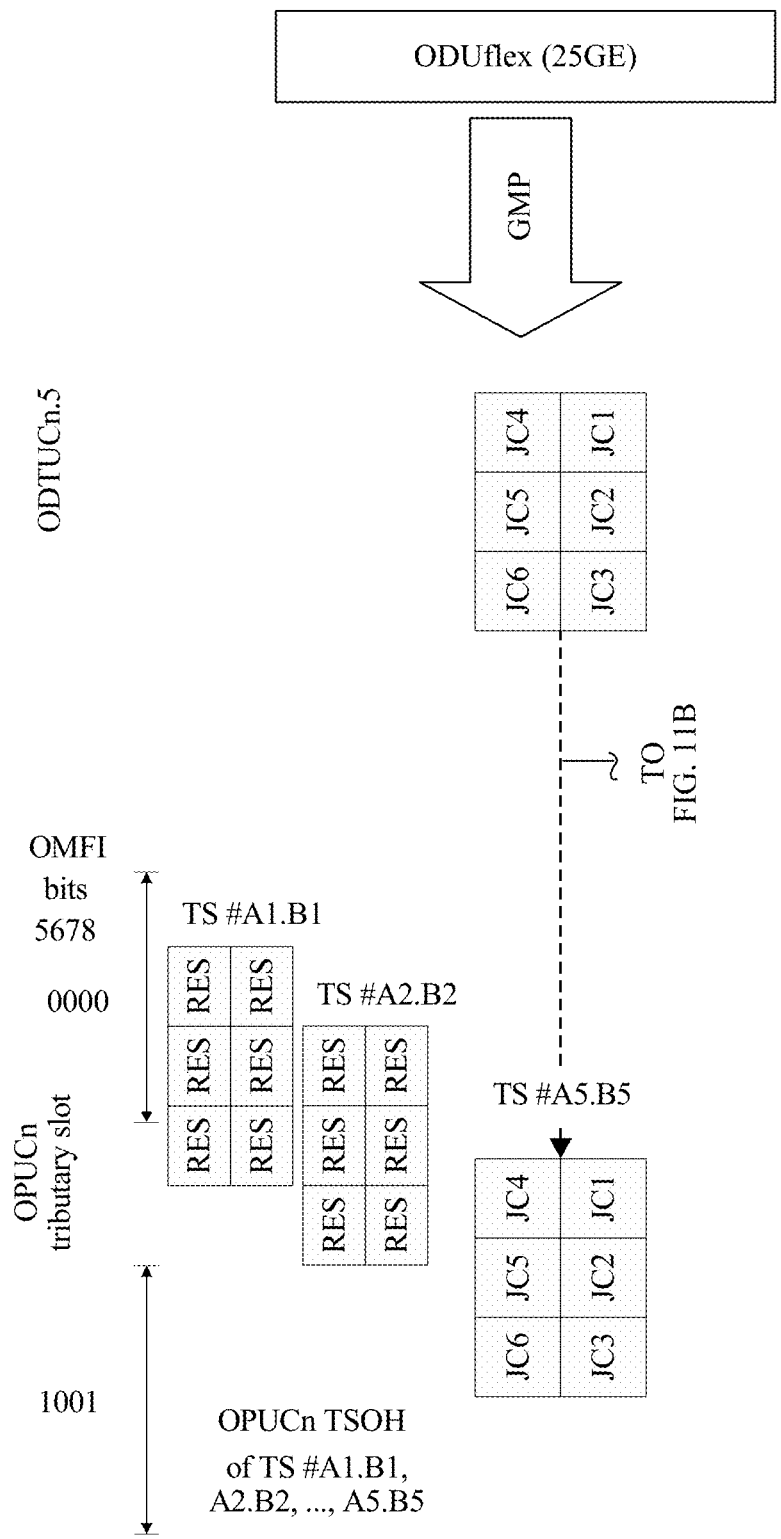
FIG. 11A to FIG. 11B are a schematic diagram of a process in which two ODUflexes (25 GE) are mapped and multiplexed to an OPUCn according to an embodiment of the present invention.
Figure 11B:
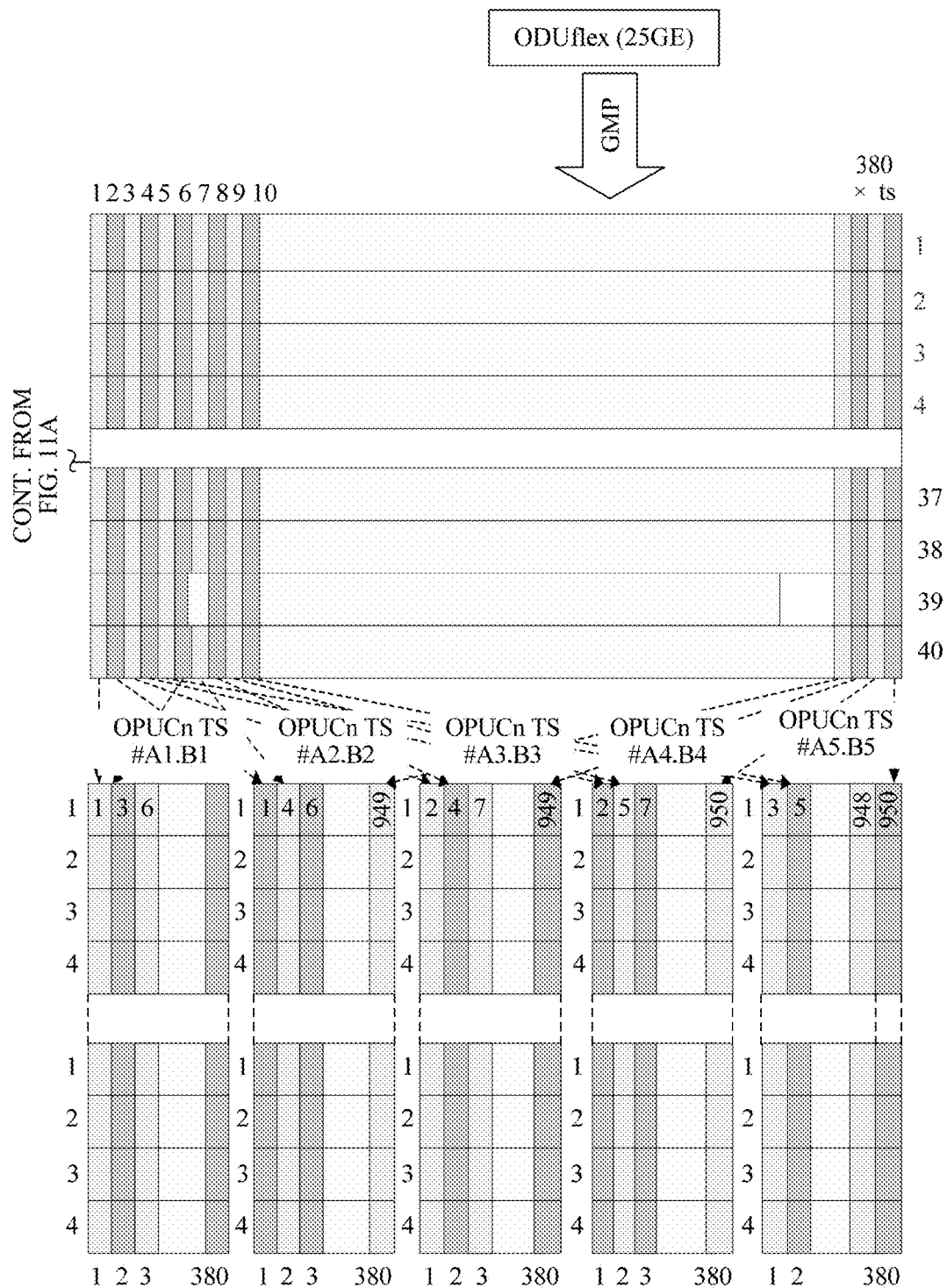

FIG. 11 shows a process of multiplexing two ODTUCn.2.5s into an OPUCn, and this is equivalent to multiplexing an ODTUCn.5 into a TS A1.B1, a TS A2.B2, . . . , and a TS A5.B5. A multiplexing processing procedure of the two ODTUCn.2.5s is shown in FIG. 11.

In addition, description is provided by assuming that an ODTUCn.2.5 is multiplexed into an OPUCn. In addition to the multiplexing manners shown above (multiplexing into five tributary slots of the OPUCn), more centralized multiplexing of the ODTUCn.2.5 maybe considered, such as multiplexing into three 10G tributary slots of the OPUCn. Table 2 shows six possible manners. Each 10G tributary slot of the OPUCn is sequentially divided into odd columns and even columns at intervals of columns, the odd columns are a tributary slot TS A.B.1, and the even columns are a tributary slot TS A.B.2.

TABLE 2

Six manners of multiplexing an ODTUCn.2.5 into an OPUCn

| | TS #A1.B1 | TS #A2.B2 | TS #A3.B3 |
|---|---|---|---|
| 1 | Odd columns + even columns | Odd columns + even columns | Odd columns |
| 2 | Odd columns + even columns | Odd columns + even columns | Even columns |
| 3 | Odd columns + even columns | Odd columns | Odd columns + even columns |
| 4 | Odd columns + even columns | Even columns | Odd columns + even columns |
| 5 | Odd columns | Odd columns + even columns | Odd columns + even columns |
| 6 | Even columns | Odd columns + even columns | Odd columns + even columns |

Figure 12A:
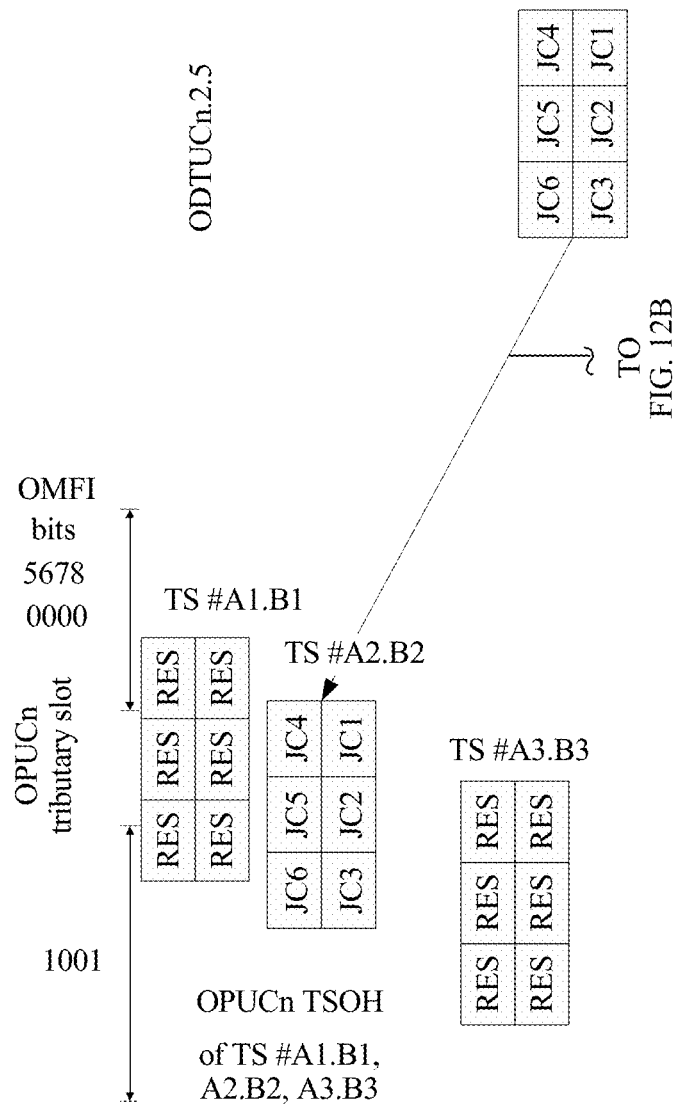
FIG. 12A to FIG. 12B are a schematic diagram of a manner of multiplexing an ODTUCn.2.5 to two and a half OPUCn 10G tributary slots according to an embodiment of the present invention.
Figure 12B:
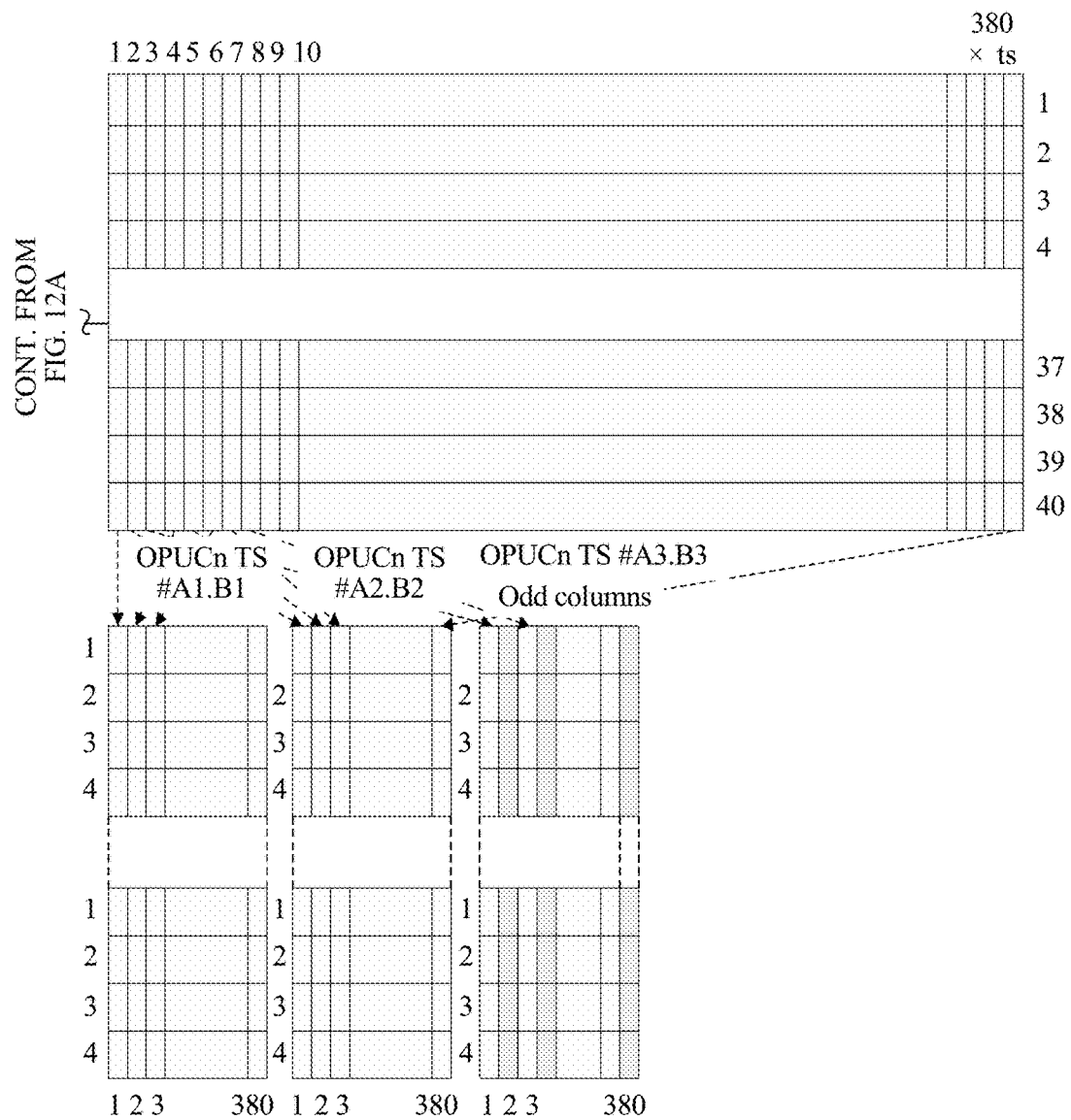
Figure 13A:
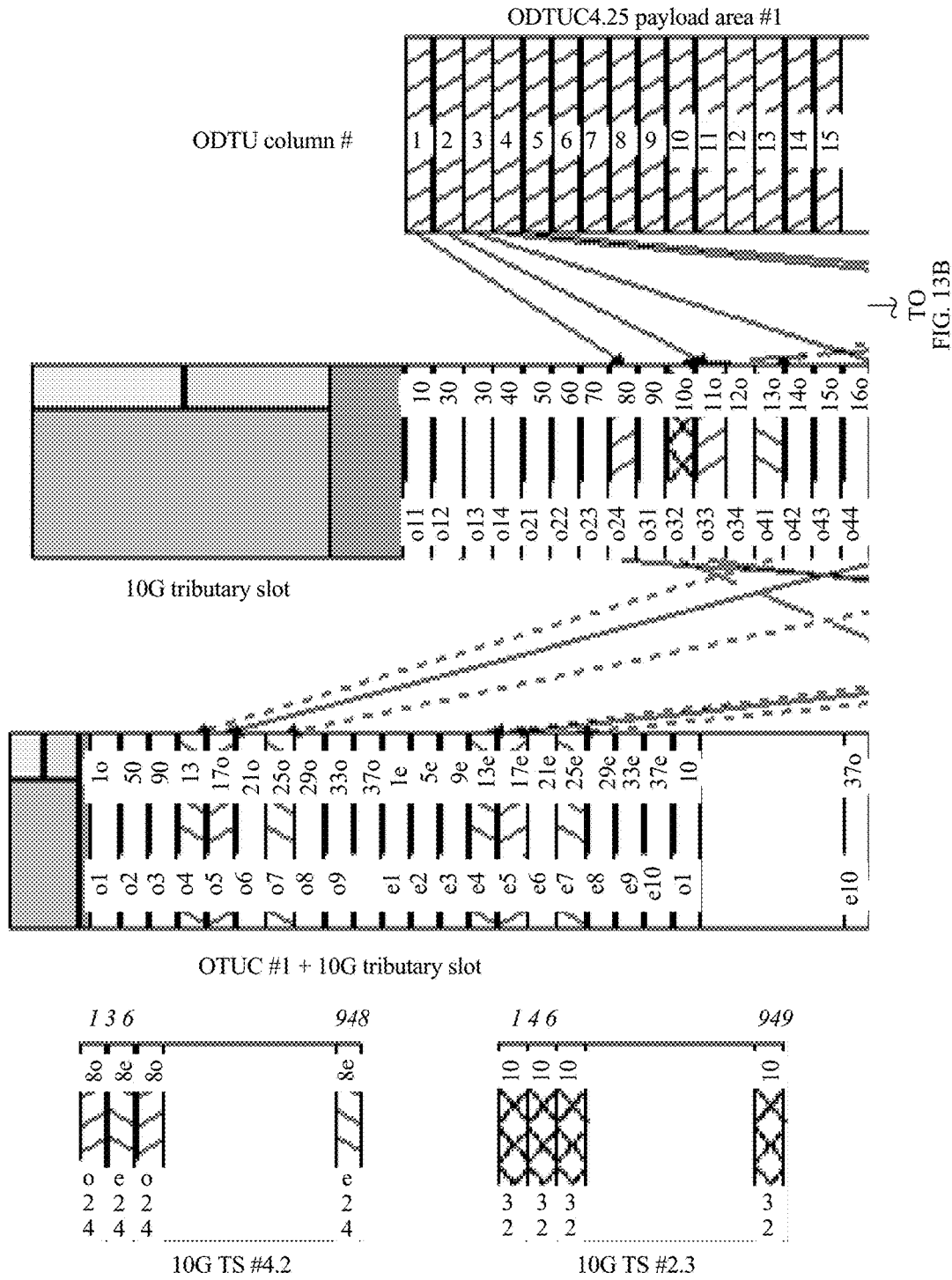
FIG. 13A to FIG. 13D are a schematic diagram of a manner of multiplexing three ODTUCn.2.5s to OPUCn 10G tributary slots according to an embodiment of the present invention.
Figure 13B:
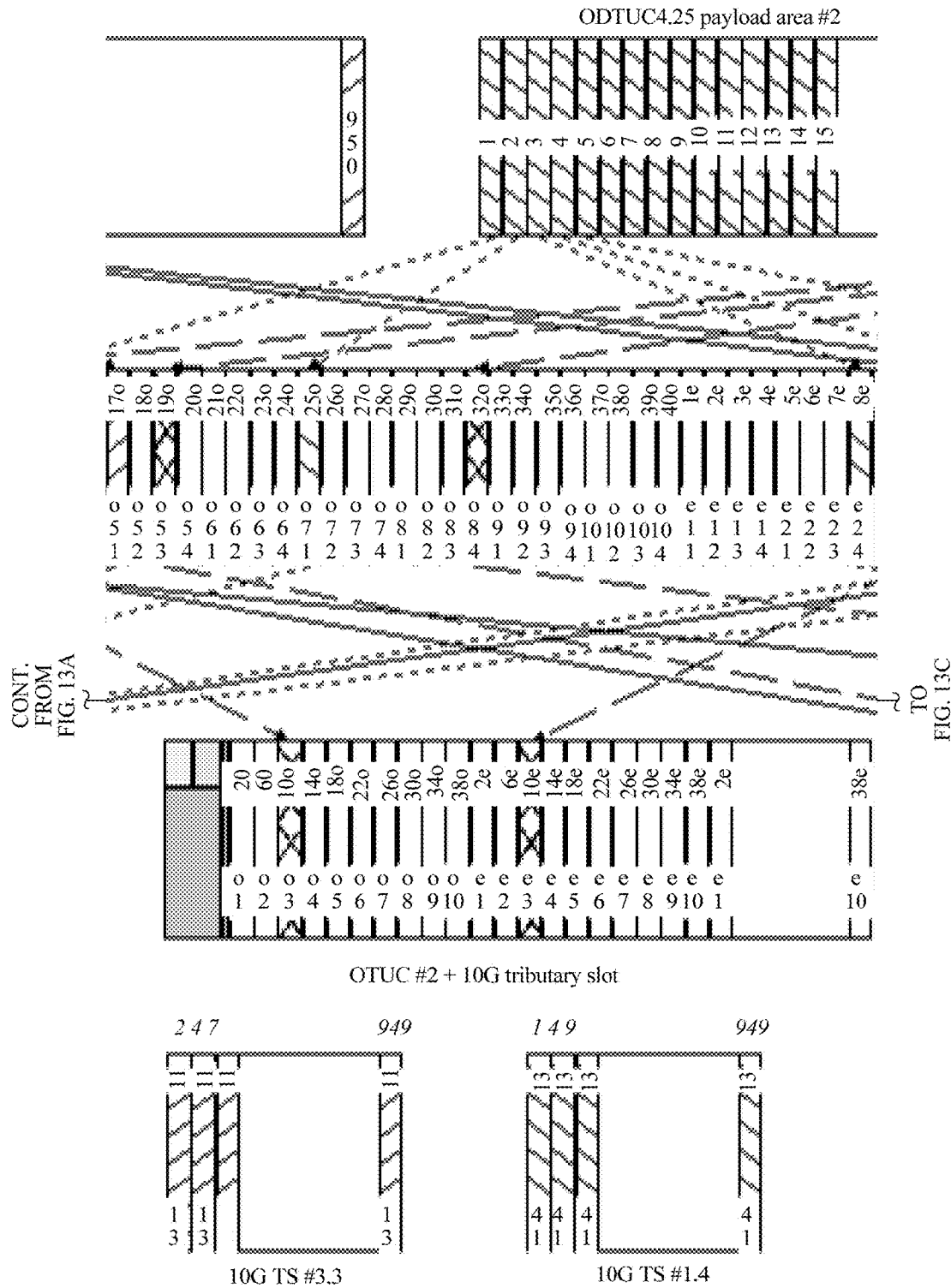
Figure 13C:
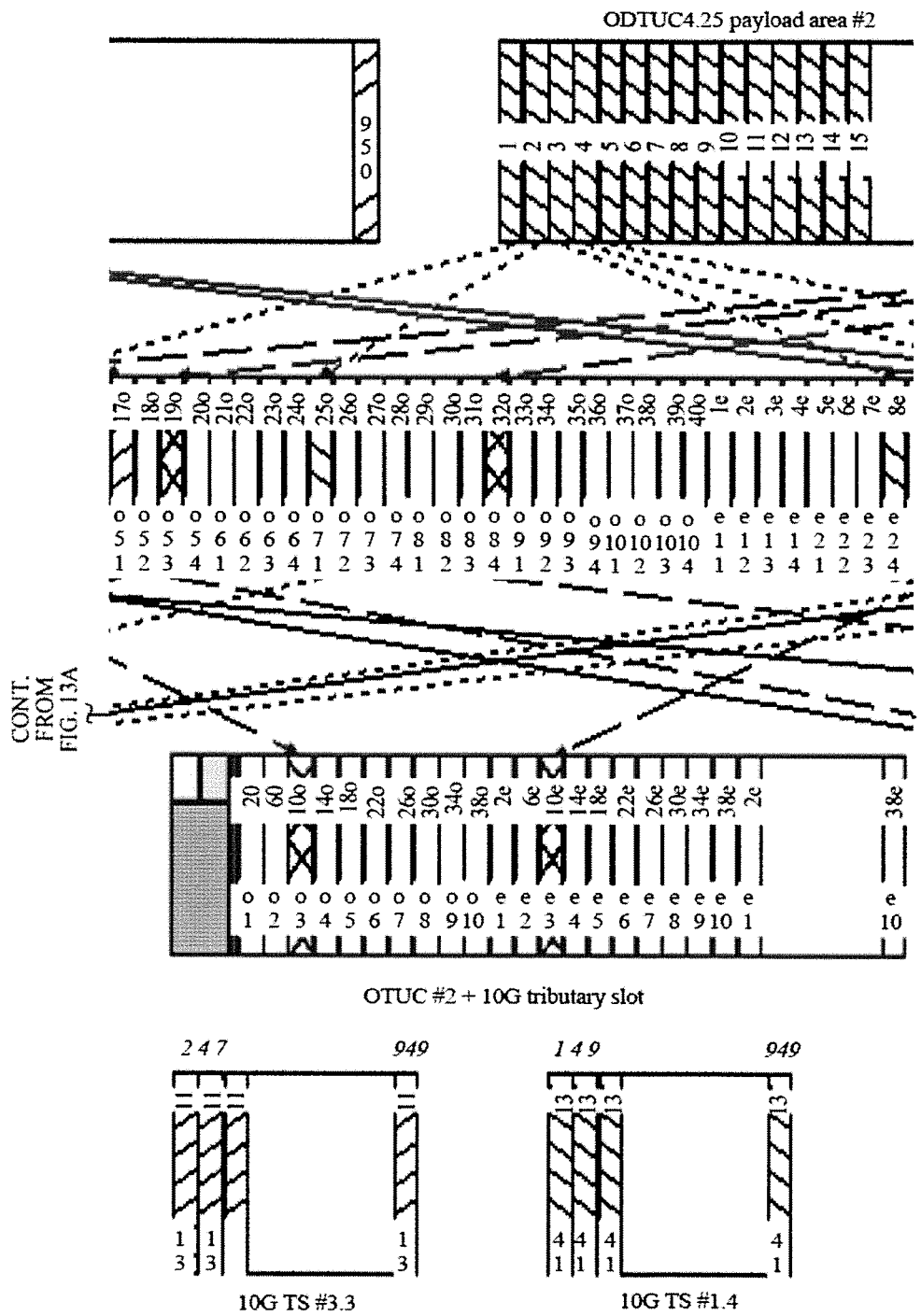
Figure 13D:
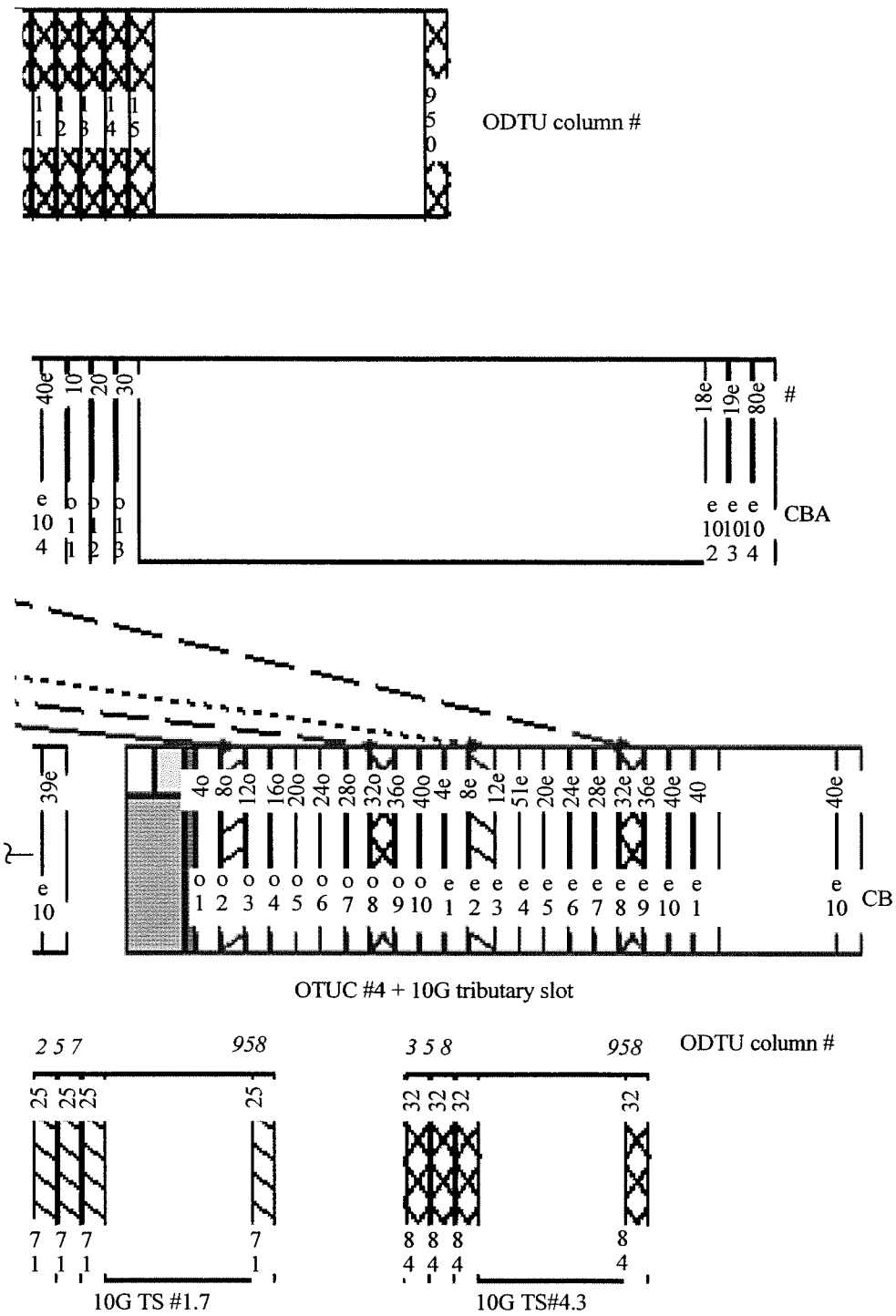

FIG. 12A to FIG. 12B are a case of the first multiplexing manner. 40 rows and 950 columns of an ODTUCn.2.5 are sequentially multiplexed into a TS A1.B1, a TS A2.B2, and a TS A3.B3 in a manner shown in the figure, that is, odd columns and even columns of the TS A1.B1 and the TS A2.B2, and odd columns of the TS A3.B3 are occupied.

FIG. 13A to FIG. 13D show a case of multiplexing three ODUflexes (25GE) into an OPUC4, where the second, the third, and the fifth manners of multiplexing an ODTUCn.2.5 into an OPUCn are shown separately. An ODTUC4.2.5 #1 is multiplexed into a TS 4.2 (odd columns), a TS 3.3 and a TS 1.5 of an OPUC4; an ODTUC4.2.5 #2 is multiplexed into a TS 4.2 (even columns), a TS 1.4 and a TS 1.7 of the OPUC4; and an ODTUC4.2.5 #3 is multiplexed into a TS 2.3, a TS 3.5 (odd columns) and a TS 4.8 of the OPUC4.

The following describes in detail a frame structure and an overhead of an embodiment of the present invention with reference to the accompanying drawings.

An embodiment of the present invention provides a frame structure. As shown in FIG. 2A to FIG. 2D, a 10-OPUCn multi-frame includes ten OPUCn frames, each OPUCn frame includes four rows, columns $14n+1$ to $16n$ are an OPUCn overhead area, columns $3816n$ to $3824n$ in the OPUCn payload area are a spare padding area, and the other $3800n$ columns in the OPUCn payload area are used to carry a service signal. One OPUCn includes $10n$ tributary slots, and a rate of each tributary slot is 10G. Each tributary slot occupies 380 columns of corresponding data columns of the OPUCn. For example, the first tributary slot TS 1.1 occupies column $16n+1$, column $26n+1$, column $36n+1$, . . . , and column $3806n+1$; the second tributary slot TS 2.1 occupies column $16n+2$, column $26n+2$, column $36n+2$, . . . , and column $3806n+2$; the $(n+1)^{th}$ tributary slot TS 1.2 occupies column $17n+1$, column $27n+1$, column $37n+1$, . . . , and column $3807n+1$; and the rest maybe deduced by analogy.

When one tributary slot is divided into smaller grains, for example, when the TS 1.1 is subdivided into two TS 1.1.1 and TS 1.1.2, each subdivided grain occupies one half of the data columns occupied by the TS 1.1. For example, the TS 1.1.1 may occupy odd columns such as column $16n+1$, column $36n+1$, . . . , and column $3796n+1$, and the TS 1.1.2 may occupy column $26n+1$, column $46n+1$, . . . , and column $3806n+1$. Certainly, there may also be another allocation method. For example, the first half of data columns are allocated to the tributary slot TS 1.1.1, and the second half of data columns are allocated to the TS 1.1.2. This is not limited in this embodiment of the present invention. It should be noted that, an odd-even column interleaving allocation manner is a preferred solution, because this solution can reduce a service delay.

As shown in FIG. 2A to FIG. 2D, each tributary slot occupies an overhead of three rows and two columns. For example, an overhead TSOH TS 1.1 corresponding to the first tributary slot TS 1.1 occupies column $14n+1$ and column $15n+1$ of rows 1 to 3 of the first OPUCn frame; an overhead TSOH TS 2.1 corresponding to the second tributary slot TS 2.1 occupies column $14n+2$ and column $15n+2$ of rows 1 to 3 of the first OPUCn frame; an overhead TSOH TS 2.1 corresponding to the $(n+1)^{th}$ tributary slot TS 1.2 occupies column $14n+1$ and column $15n+1$ of rows 1 to 3 of the second OPUCn frame, and the rest may be deduced by analogy.

When one tributary slot is divided into smaller grains, an existing overhead may be extended, to extend the existing overhead TSOH TS1.1 into descriptions of mapping overhead information of two subdivided TS 1.1.1 and TS 1.1.2. Optionally, mapping overhead information of the first TS 1.1.1 may also be described by using a corresponding overhead location of the first 10-OPUCn multi-frame, and mapping overhead information of the other TS 1.1.2 may be described by using a corresponding overhead location of a next 10-OPUCn multi-frame. A smaller granularity may be deduced by analogy.

Specifically, as shown in Table 1, mapping overhead information of different subdivided grains may be indicated by extending an OMFI field. Bits 5 to 8 of the OMFI are used to indicate a location, in the 10-OPUCn, of an OPUCn frame in which the OMFI is located, and bits 1 to 4 of the OMFI are used to indicate a multi-frame identifier, that is, are used to indicate which multi-frame is the current multi-frame. An initial value of the OMFI may be 0. Certainly, the initial value may also be another number. The value is incremented by 1 from 0 to 15 consecutively for each 10-OPUCn multi-frame. For a case in which a 10G tributary slot is subdivided into two 5G, overhead information of the TS 1.1.1 and the TS 1.1.2 may be available once every twenty OPUCn frames. Then, a corresponding tributary slot overhead in an OPUCn in which an OMFI with bits 1 to 4 of an even number and bits 5 to 8 of 0000 is located may be used to carry the overhead information of the TS 1.1.1, and a corresponding tributary slot overhead in an OPUCn in which an OMFI with bits 1 to 4 of an odd number and bits 5 to 8 of 0000 is located may be used to carry the overhead information of the TS 1.1.2. A case of another tributary slot is similar, and reference may be made to Table 1 for details. It should be noted that, when a subdivided grain is smaller, for example, when the 10G tributary slot is subdivided into four 2.5G grains, a corresponding tributary slot overhead may be available once every forty frames. In this case, the $n^{th}$ multi-frame and the $(n+4)^{th}$ multi-frame indicated by bits 1 to 4 of an OMFI carry a same tributary slot overhead.

Columns 14n+1 to 15n of row 4 of each OPUCn frame are a payload structure identifier PSI. All PSIs of a 256-OPUCn multi-frame are combined together and are used to transmit allocation information of corresponding 10n tributary slots. As shown in FIG. 4, in formation formed by PSIs of one 256-OPUCn multi-frame, a payload type indicator is carried at byte 1, that is, the first PSI byte of the first OPUCn frame, and is used to indicate whether an OPUCn carries a client signal that occupies a non-integral quantity of tributary slots. When only a client signal that occupies a non-integral quantity of tributary slots is carried, a value of the payload type indicator may be 0x23; and when only a client signal that occupies an integral quantity of tributary slots is carried, a value of the payload type indicator may be 0x22. Further optionally, when both a client signal that occupies a non-integral quantity of tributary slots and a client signal that occupies an integral quantity of tributary slots are carried, a value of the payload type indicator may be another corresponding value. That "only a client signal that occupies a non-integral quantity of tributary slots is carried" herein may refer to carrying the client signal by using only a granularity of one half of a tributary slot bandwidth or one fourth of the tributary slot bandwidth. For example, when each tributary slot has a 10G bandwidth, client data is carried by using a granularity of 5G or 2.5G.

More specifically, when a service is carried by using a granularity smaller than one tributary slot, the PSI may be further extended. For example, in this case, two PSI bytes corresponding to each 10G tributary slot are further allocated. Bit 1 of byte 1 indicates whether a corresponding A.B.1 is occupied, and if the corresponding A.B.1 is occupied, a value 1 is assigned; otherwise, a value 0 is assigned. Bits 2 to 8, seven bits in total, are used to indicate a tributary port number allocated to the A.B.1. Bit 1 of byte 2 indicates whether a corresponding A.B.2 is occupied, and if the corresponding A.B.2 is occupied, a value 1 is assigned; otherwise, a value 0 is assigned. Bits 2 to 8, seven bits in total, are used to indicate a tributary port number allocated to the A.B.2, as shown in FIG. 14. When an OPUCn signal carries, in a mixed manner, an LO ODU service of a rate that is an integer multiple of 10G and an ODUflex service of a rate that is a non-integer multiple of 10G, a payload type (Payload Type, PT) is assigned a value of 0x24, and is located in column 14n+1 of row 4. In this case, a pattern indication of two PSI bytes corresponding to each 10G tributary slot is shown in FIG. 15. Bit 1 of byte 1 indicates whether the 10G tributary slot is occupied, and if the 10G tributary slot is occupied, a value 1 is assigned. Further, bits 2 to 8 of byte 1 and bits 1 to 8 of byte 2, fifteen bits in total, indicate a tributary port number allocated to a corresponding tributary slot, that is, an LO ODU service indicator carried in the tributary slot; if the 10G tributary slot is not occupied, a value 0 is assigned. Further, bit 2 of byte 1 indicates whether a corresponding A.B.1 is occupied, and if the corresponding A.B.1 is occupied, a value 1 is assigned; otherwise, a value 0 is assigned. Bits 3 to 8, six bits in total, are used to indicate a tributary port number allocated to the A.B.1. Bit 2 of byte 2 indicates whether a corresponding A.B.2 is occupied, and if the corresponding A.B.2 is occupied, a value 1 is assigned; otherwise, a value 0 is assigned. Bits 3 to 8, six bits in total, are used to indicate a tributary port number allocated to the A.B.2. Bit 1 of byte 2 is reserved.

An embodiment of the present invention further provides a signal processing method, including: performing demultiplexing processing on a received optical channel payload unit OPUCn to determine an optical channel data tributary unit Cn ODTUCn.X including X tributary slots, where X is a non-integer; performing demapping processing on the ODTUCn.X to obtain a first ODUflex; and performing demapping processing on the first ODUflex to obtain a first client signal. The OPUCn may be an OPUCn multi-frame, such as a 10-OPUCn multi-frame or a 256-OPUCn multi-frame.

Optionally, the ODTUCn.X includes one or more ODTUCn.$1.2^x$s, where each ODTUCn.$1.2^x$ occupies $1/2^x$ of a tributary slot in the OPUCn, and x is equal to 1, 2, 3, 4, or 5. Certainly, optionally, the ODTUCn.$1.2^x$ may further occupy, for example, 0.3, 0.6, or 0.75 of the tributary slot. This is not limited in this embodiment of the present invention.

An overhead of the OPUCn includes a payload type PT identifier and a payload structure identifier PSI, the PT identifier is used to indicate that the OPUCn carries a client signal that occupies a non-integral quantity of tributary slots; the PSI is used to indicate tributary slots occupied by the one or more ODTUCn.$1.2^x$s; and the performing demultiplexing processing on the OPUCn to determine an optical channel data tributary unit Cn ODTUCn.X including X tributary slots includes: determining, according to the PSI in the OPUCn obtained by parsing the OPUCn, the tributary slots occupied by the one or more ODTUCn.$1.2^x$s, to determine the ODTUCn.X.

Specifically, the overhead of the OPUCn includes an OPUCn multi-frame identifier OMFI, and eight bits of the OMFI are used to indicate overhead locations of the ODTUCn.$1.2^x$s; and the performing demapping processing on the ODTUCn.X to obtain a first ODUflex includes: determining overhead information of the one or more ODTUCn.$1.2^x$s according to the OMFI in the OPUCn obtained by parsing the OPUCn, and performing demapping processing on the ODTUCn.X according to the determined overhead information, to obtain the first ODUflex.

As described above, by parsing the OPUCn, a corresponding PSI and OMFI may be obtained from the overhead information of the OPUCn. Because the PSI indicates the tributary slots occupied by the one or more ODTUCn.$1.2^x$s constituting the ODTUCn.X, and the OMFI indicates mapping overhead information of each ODTUCn.$1.2^x$, after the tributary slots occupied by the one or more ODTUCn.$1.2^x$s and overhead information corresponding to the tributary slots occupied by the ODTUCn.$1.2^x$s are determined by using the PSI and the OMFI, the first ODUflex is obtained by demapping the corresponding ODTUCn.X.

In the method provided in this embodiment of the present invention, a specific structure in a corresponding frame is described. It is understandable that, a corresponding frame structure may be obtained by performing a corresponding method step. For example, the method provided in this embodiment of the present invention may have a step of adding overhead information, such as adding mapping information of a subdivided tributary slot to a corresponding overhead location to obtain a frame structure having the overhead information. Further, an extended PSI may be used to indicate an allocation status of a corresponding subdivided tributary slot, and an OMFI is used to indicate a specific location in which corresponding mapping information is located. For another example, a mapping step may be used to multiplex a corresponding client signal or service into an allocated tributary slot in an OPUCn. For example, one tributary slot may be shared by inserting a first ODUflex signal to odd columns of data columns of one tributary slot and inserting a second ODUflex signal to even columns of the data columns belonging to the same tributary slot. For example, each of the first ODUflex signal and the second ODUflex signal may occupy a 5G bandwidth of the shared tributary slot. A specific implementation sequence of these steps is not limited in this embodiment of the present invention.

An embodiment of the present invention further provides a network apparatus, including: a processing unit, configured to map a received first client signal into a first ODUflex; map the first ODUflex into an optical channel data tributary unit Cn ODTUCn.X including X tributary slots, where X is a non-integer; and multiplex the ODTUCn.X into an optical channel payload unit Cn OPUCn.

Optionally, the processing unit includes: a first mapping unit, configured to map the received first client signal into the first ODUflex; a second mapping unit, configured to map the first ODUflex into the optical channel data tributary unit Cn ODTUCn.X including X tributary slots, where X is a non-integer; and a multiplexing unit, configured to multiplex the ODTUCn.X into the optical channel payload unit Cn OPUCn.

Optionally, the processing unit includes a processor and a computer readable medium; the computer readable medium stores a computer executable instruction; and when being executed by the processor, the instruction drives the processor to: map the received first client signal into the first ODUflex; map the first ODUflex into the optical channel data tributary unit Cn ODTUCn.X including X tributary slots, where X is a non-integer; and multiplex the ODTUCn.X into the optical channel payload unit Cn OPUCn.

Optionally, the ODTUCn.X includes one or more ODTUCn.1.2$^x$s, where each ODTUCn.1.2$^x$ occupies 1/2$^x$ of a tributary slot in the OPUCn, and x is equal to 1, 2, 3, 4, or 5.

Optionally, an overhead of the OPUCn includes a payload structure identifier PSI, the PSI includes a payload type PT identifier and a multiplex structure identifier MSI, the PT identifier is used to indicate that the OPUCn carries a client signal that occupies a non-integral quantity of tributary slots, and the MSI is used to indicate tributary slots occupied by the one or more ODTUCn.1.2$^x$s.

Optionally, at least one ODTUCn.1.2$^x$ that carries the first client signal and at least one ODTUCn.1.2$^y$ that carries another client signal share one tributary slot in the OPUCn, where each ODTUCn.1.2$^y$ occupies 1/2$^y$ of a tributary slot in the OPUCn, and y is equal to 1, 2, 3, 4, or 5.

Optionally, one ODTUCn.1.2$^x$ and one ODTUCn.1.2$^y$ share one tributary slot in the OPUCn, where both x and y are equal to 1; and the shared tributary slot in the OPUCn includes multiple data columns for carrying the client signals, where odd data columns are occupied by the ODTUCn.1.2$^x$, and even data columns are occupied by the ODTUCn.1.2$^y$.

An embodiment of the present invention further provides a network apparatus, including: a processing unit, configured to: perform demultiplexing processing on a received optical channel payload unit OPUCn to determine an optical channel data tributary unit Cn ODTUCn.X including X tributary slots, where X is a non-integer; perform demapping processing on the ODTUCn.X to obtain a first ODUflex; and perform demapping processing on the first ODUflex to obtain a first client signal.

Optionally, the processing unit includes: a demultiplexing unit, configured to perform demultiplexing processing on the received optical channel payload unit OPUCn to determine the optical channel data tributary unit Cn ODTUCn.X including X tributary slots, where X is a non-integer; a first demapping unit, configured to perform demapping processing on the ODTUCn.X to obtain the first ODUflex; and a second demapping unit, configured to perform demapping processing on the first ODUflex to obtain the first client signal.

Optionally, the processing unit includes a processor and a computer readable medium; the computer readable medium stores a computer executable instruction; and when being executed by the processor, the instruction drives the processor to: perform demultiplexing processing on the received optical channel payload unit OPUCn to determine the optical channel data tributary unit Cn ODTUCn.X including X tributary slots, where X is a non-integer; perform demapping processing on the ODTUCn.X to obtain the first ODUflex; and perform demapping processing on the first ODUflex to obtain the first client signal.

Optionally, the ODTUCn.X includes one or more ODTUCn.1.2$^x$s, where each ODTUCn.1.2$^x$ occupies 1/2$^x$ of a tributary slot in the OPUCn, and x is equal to 1, 2, 3, 4, or 5.

Optionally, an overhead of the OPUCn includes a payload structure identifier PSI, the PSI includes a payload type PT identifier and a multiplex structure identifier MSI, the PT identifier is used to indicate that the OPUCn carries a client signal that occupies a non-integral quantity of tributary slots, and the MSI is used to indicate tributary slots occupied by the one or more ODTUCn.1.2$^x$s; and the demultiplexing unit is specifically configured to determine, according to the PSI in the OPUCn obtained by parsing the OPUCn, the tributary slots occupied by the one or more ODTUCn.1.2$^x$s, to determine the ODTUCn.X.

Optionally, the overhead of the OPUCn includes an OPUCn multi-frame identifier OMFI, and eight bits of the OMFI are used to indicate overhead locations of the ODTUCn.1.2$^x$s; and the first demapping unit is specifically configured to determine overhead information of the one or more ODTUCn.1.2$^x$s according to the OMFI in the OPUCn obtained by parsing the OPUCn, and perform demapping processing on the ODTUCn.X according to the determined overhead information, to obtain the first ODUflex.

The foregoing processor may be one of a digital signal processor DSP, a field programmable gate array FPGA, or an application specific integrated circuit ASIC.

It is understandable that, the methods in the embodiments of the present invention may be executed by the network apparatus provided in this embodiment of the present invention. That is, the network apparatus provided in this embodiment of the present invention has a function of executing all or some of the foregoing methods. Specifically, corresponding functions may be implemented by the processing unit in the network apparatus, and specifically, may be implemented by a corresponding detailed functional module in a corresponding processing unit. Alternatively, the methods provided in the embodiments of the present invention may be converted into instructions by programming or in another manner, the instructions are stored in a corresponding computer readable medium or are solidified in corresponding hardware, and when being executed, the instructions may drive a processor that is configured to execute the instructions to implement the methods described in the embodiments of the present invention.

An embodiment of the present invention further provides a communications system, where the communications system includes any one of the foregoing network apparatuses at a transmit end and any one network apparatus at a receive end.

An embodiment of the present invention further provides a computer readable medium, where the computer readable medium is configured to store an instruction, and when being executed by a computer, the instruction drives the computer to execute any one of the methods described above.

An embodiment of the present invention further provides an optical transport network frame structure, where the frame structure includes an optical channel payload unit Cn OPUCn overhead area and an OPUCn payload area, and the OPUCn includes a payload structure identifier PSI and an OPUCn multi-frame identifier OMFI, where the PSI is used to indicate tributary slots occupied by an optical channel data tributary unit Cn ODTUCn.X including X tributary slots, where X is a non-integer.

Optionally, the ODTUCn.X includes one or more ODTUCn.$1.2^x$s, where each ODTUCn.$1.2^x$ occupies $1/2^x$ of a tributary slot in the OPUCn, and x is equal to 1, 2, 3, 4, or 5; and the PSI is used to indicate a tributary slot occupied by each of the one or more ODTUCn.$1.2^x$s.

Optionally, the PSI is further used to indicate tributary slots occupied by an optical channel data tributary unit Cn ODTUCn.Y including Y tributary slots, where Y is a non-integer; the ODTUCn.Y includes one or more ODTUCn.$1.2^y$s, where each ODTUCn.$1.2^y$ occupies $1/2^y$ of a tributary slot in the OPUCn; one ODTUCn.$1.2^x$ and one ODTUCn.$1.2^y$ share one tributary slot in the OPUCn payload area, where both x and y are equal to 1; and the shared tributary slot in the OPUCn includes multiple data columns for carrying client signals, where odd data columns are occupied by the ODTUCn.$1.2^x$, and even data columns are occupied by the ODTUCn.$1.2^y$.

Optionally, eight bits of the OMFI are used to indicate an overhead location of each ODTUCn.$1.2^x$.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A signal processing method, comprising:
mapping a received first client signal into a first optical channel data unit (ODUflex);
mapping the first ODUflex into an optical channel data tributary unit (ODTUCn.X), wherein X is a non-integer; and
multiplexing the ODTUCn.X into an optical channel payload unit (OPUCn), wherein the ODTUCn.X occupies a fractional portion of at least one tributary slot in the OPUCn, the at least one tributary slot of the OPUCn is occupied by multiple client signals, the OPUCn is configured for a transmission rate of 100 Gbit/s or greater, and each of the at least one tributary slot of the OPUCn has a 10 Gbit/s bandwidth.

2. The method according to claim 1, wherein the ODTUCn.X comprises one or more ODTUCn.$1.2^x$s, wherein each ODTUCn.$1.2^x$ occupies $1/2^x$ of a tributary slot in the OPUCn, and x is equal to 1, 2, 3, 4, or 5.

3. The method according to claim 2, wherein:
an overhead of the OPUCn comprises a payload structure identifier (PSI), the PSI comprises a payload type (PT) identifier and a multiplex structure identifier (MSI), the PT identifier is used to indicate that the OPUCn carries a client signal that occupies a non-integral quantity of tributary slots, and the MSI is used to indicate tributary slots occupied by the one or more ODTUCn.$1.2^x$s.

4. The method according to claim 1, further comprising:
mapping a received second client signal into a second ODUflex;
mapping the second ODUflex into an optical channel data tributary unit (ODTUCn.Z) comprising Z tributary slots, wherein Z is an integer; and
multiplexing the ODTUCn.Z into the OPUCn.

5. The method according to claim 2, wherein at least one ODTUCn.$1.2^x$ that carries the first client signal and at least one ODTUCn.$1.2^y$ that carries another client signal share one tributary slot in the OPUCn, wherein each ODTUCn.$1.2^y$ occupies $1/2^y$ of a tributary slot in the OPUCn, and y is equal to 1, 2, 3, 4, or 5.

6. The method according to claim 5, wherein:
one ODTUCn.$1.2^x$ and one ODTUCn.$1.2^y$ share one tributary slot in the OPUCn, wherein both x and y are equal to 1; and
the shared tributary slot in the OPUCn comprises multiple data columns for carrying the client signals, wherein odd data columns are occupied by the ODTUCn.$1.2^x$, and even data columns are occupied by the ODTUCn.$1.2^y$.

7. The method according to claim 2, wherein an overhead of the OPUCn comprises an OPU multi-frame identifier (OMFI), and eight bits of the OMFI are used to indicate an overhead location of each ODTUCn.$1.2^x$.

8. A signal processing method, comprising:
performing demultiplexing processing on a received optical channel payload unit (OPUCn) to determine an optical channel data tributary unit (ODTUCn.X) occupying a fractional portion of at least one tributary slot of the OPUCn, wherein X is a non-integer, the at least one tributary slot of the OPUCn is occupied by multiple client signals, the OPUCn is configured for a transmission rate of 100 Gbit/s or greater, and each of the at least one tributary slot of the OPUCn has a 10 Gbit/s bandwidth;
performing demapping processing on the ODTUCn.X to obtain a first optical channel data unit (ODUflex); and
performing demapping processing on the first ODUflex to obtain a first client signal.

9. The method according to claim 8, wherein the ODTUCn.X comprises one or more ODTUCn.$1.2^x$s, wherein each ODTUCn.1.2$^x$ occupies 1/2$^x$ of a tributary slot in the OPUCn, and x is equal to 1, 2, 3, 4, or 5.

10. The method according to claim 9, wherein:
an overhead of the OPUCn comprises a payload structure identifier (PSI), the PSI comprises a payload type (PT) identifier and a multiplex structure identifier (MSI), the PT identifier is used to indicate that the OPUCn carries a client signal that occupies a non-integral quantity of tributary slots, and the MSI is used to indicate tributary slots occupied by the one or more ODTUCn.1.2$^x$s; and
performing demultiplexing processing on the OPUCn to determine the ODTUCn.X comprises:
  determining, according to the PSI in the OPUCn obtained by parsing the OPUCn, the tributary slots occupied by the one or more ODTUCn.1.2$^x$s, to determine the ODTUCn.X.

11. The method according to claim 9, wherein:
an overhead of the OPUCn comprises an OPUCn multiframe identifier (OMFI), and eight bits of the OMFI are used to indicate overhead locations of the ODTUCn.1.2$^x$s; and
performing demapping processing on the ODTUCn.X to obtain the first ODUflex comprises:
  determining overhead information of the one or more ODTUCn.1.2$^x$s according to the OMFI in the OPUCn obtained by parsing the OPUCn, and performing demapping processing on the ODTUCn.X according to the determined overhead information, to obtain the first ODUflex.

12. A network apparatus, comprising:
a processor; and
a computer readable medium configured to store computer executable instructions which, when executed by the processor, cause the processor to:
  map a received first client signal into a first optical channel data unit (ODUflex),
  map the first ODUflex into an optical channel data tributary unit (ODTUCn.X), wherein X is a non-integer, and
  multiplex the ODTUCn.X into an optical channel payload unit (OPUCn), wherein the ODTUCn.X occupies a fractional portion of at least one tributary slot in the OPUCn, the at least one tributary slot of the OPUCn is occupied by multiple client signals, the OPUCn is configured for a transmission rate of 100 Gbit/s or greater, and each of the at least one tributary slot of the OPUCn has a 10 Gbit/s bandwidth.

13. The network apparatus according to claim 12, wherein the ODTUCn.X comprises one or more ODTUCn.1.2$^x$s, wherein each ODTUCn.1.2$^x$ occupies 1/2$^x$ of a tributary slot in the OPUCn, and x is equal to 1, 2, 3, 4, or 5.

14. The network apparatus according to claim 13, wherein:
an overhead of the OPUCn comprises a payload structure identifier (PSI), the PSI comprises a payload type (PT) identifier and a multiplex structure identifier (MSI), the PT identifier is used to indicate that the OPUCn carries a client signal that occupies a non-integral quantity of tributary slots, and the MSI is used to indicate tributary slots occupied by the one or more ODTUCn.1.2$^x$s.

15. The network apparatus according to claim 12, wherein at least one ODTUCn.1.2$^x$ that carries the first client signal and at least one ODTUCn.1.2$^y$ that carries another client signal share one tributary slot in the OPUCn, wherein each ODTUCn.1.2$^y$ occupies 1/2$^y$ of a tributary slot in the OPUCn, and y is equal to 1, 2, 3, 4, or 5.

16. The network apparatus according to claim 15, wherein:
one ODTUCn.1.2$^x$ and one ODTUCn.1.2$^y$ share one tributary slot in the OPUCn, wherein both x and y are equal to 1; and
the shared tributary slot in the OPUCn comprises multiple data columns for carrying the client signals, wherein odd data columns are occupied by the ODTUCn.1.2$^x$, and even data columns are occupied by the ODTUCn.1.2$^y$.

17. A network apparatus, comprising:
a processor; and
a computer readable medium configured to store computer executable instructions which, when executed by the processor, cause the processor to:
  perform demultiplexing processing on a received optical channel payload unit (OPUCn) to determine an optical channel data tributary unit (ODTUCn.X) occupying a fractional portion of at least one tributary slot of the OPUCn, wherein X is a non-integer, the at least one tributary slot of the OPUCn is occupied by multiple client signals, the OPUCn is configured for a transmission rate of 100 Gbit/s or greater, and each of the at least one tributary slot of the OPUCn has a 10 Gbit/s bandwidth,
  perform demapping processing on the ODTUCn.X to obtain a first optical channel data unit (ODUflex), and
  perform demapping processing on the first ODUflex to obtain a first client signal.

18. The network apparatus according to claim 17, wherein the ODTUCn.X comprises one or more ODTUCn.1.2$^x$s, wherein each ODTUCn.1.2$^x$ occupies 1/2$^x$ of a tributary slot in the OPUCn, and x is equal to 1, 2, 3, 4, or 5.

19. The network apparatus according to claim 18, wherein:
an overhead of the OPUCn comprises a payload structure identifier (PSI), the PSI comprises a payload type (PT) identifier and a multiplex structure identifier (MSI), the PT identifier is used to indicate that the OPUCn carries a client signal that occupies a non-integral quantity of tributary slots, and the MSI is used to indicate tributary slots occupied by the one or more ODTUCn.1.2$^x$s; and
the processor is configured to determine, according to the PSI in the OPUCn obtained by parsing the OPUCn, the tributary slots occupied by the one or more ODTUCn.1.2$^x$s, to determine the ODTUCn.X.

20. The network apparatus according to claim 18, wherein:
an overhead of the OPUCn comprises an OPUCn multiframe identifier (OMFI), and eight bits of the OMFI are used to indicate overhead locations of the ODTUCn.1.2$^x$s; and
the processor is configured to:
  determine overhead information of the one or more ODTUCn.1.2$^x$s according to the OMFI in the OPUCn obtained by parsing the OPUCn, and
  perform demapping processing on the ODTUCn.X according to the determined overhead information, to obtain the first ODUflex.

21. A signal processing method, comprising:
mapping a received first client signal into a first optical channel data unit (ODUflex);
mapping the first ODUflex into an optical channel data tributary unit (ODTUCn.X), wherein X is a non-integer; and multiplexing the ODTUCn.X into an optical channel payload unit (OPUCn), wherein the ODTUCn.X occupies a fractional portion of at least one tributary slot in the OPUCn, the at least one tributary slot of the OPUCn is occupied by multiple client signals, the OPUCn is configured for a transmission rate of 100 Gbit/s or greater, and each of the at least one tributary slot of the OPUCn has a 5 Gbit/s bandwidth.

* * * * *